United States Patent
Barnes et al.

(10) Patent No.: US 6,374,115 B1
(45) Date of Patent: Apr. 16, 2002

(54) METHOD AND APPARATUS FOR TRUNKED RADIO REPEATER COMMUNICATIONS WITH BACKWARDS COMPATIBILITY

(75) Inventors: Keith W. Barnes; Rory A. Smith; Mervin L. Grindahl, all of Waseca, MN (US)

(73) Assignee: Transcrypt International/E.F. Johnson, Waseca, MN (US)

( * ) Notice: Subject to any disclaimer, the term of this patent is extended or adjusted under 35 U.S.C. 154(b) by 0 days.

(21) Appl. No.: 09/058,678

(22) Filed: Apr. 10, 1998

Related U.S. Application Data
(60) Provisional application No. 60/047,843, filed on May 28, 1997.

(51) Int. Cl.[7] .................................................. H04Q 7/20
(52) U.S. Cl. ...................... 455/520; 455/426; 455/524
(58) Field of Search ............................... 455/517, 519, 455/520, 518, 507, 426, 524

(56) References Cited

U.S. PATENT DOCUMENTS

| | | | |
|---|---|---|---|
| 3,855,422 A | 12/1974 | Cadiou et al. | 370/470 |
| RE28,577 E | 10/1975 | Schmidt | 455/13.2 |
| 3,985,961 A | 10/1976 | Voss et al. | 370/506 |
| 4,029,901 A | 6/1977 | Campbell | 455/560 |
| 4,092,600 A | 5/1978 | Zimmerman et al. | 455/525 |
| 4,127,744 A | 11/1978 | Yoshikawa et al. | 455/450 |
| 4,317,218 A | 2/1982 | Perry | 455/517 |
| 4,347,625 A | 8/1982 | Williams | 455/17 |
| 4,380,052 A | 4/1983 | Shima | 340/825.5 |
| 4,398,289 A | 8/1983 | Schoute | 370/348 |
| 4,399,555 A | 8/1983 | MacDonald et al. | 455/422 |
| 4,410,889 A | 10/1983 | Bryant et al. | 340/825.2 |
| 4,468,090 A | 8/1984 | Ulrich et al. | 385/11 |
| 4,503,533 A | 3/1985 | Tobagi et al. | 370/445 |
| 4,516,205 A | 5/1985 | Eing et al. | 370/462 |
| 4,517,561 A | 5/1985 | Burke et al. | 340/825.07 |

(List continued on next page.)

FOREIGN PATENT DOCUMENTS

| | | | |
|---|---|---|---|
| JP | 62101135 | 5/1987 | H04B/7/26 |

OTHER PUBLICATIONS

Grindahl, M.L., "Automatic Communications Control System", *Proceedings of the 30th Annual Conference of the IEEE Vehicular Technology Society*, Conference held in Dearborn, Michigan, pp. 1–5, (Sep. 15–17, 1980).

*Primary Examiner*—William Trost
*Assistant Examiner*—Rafael Perez-Gutierrez
(74) *Attorney, Agent, or Firm*—Schwegman, Lundberg, Woessner & Kluth, P.A.

(57) ABSTRACT

A trunked radio repeater communication system capable of use in a networked system includes a plurality of distributive switches and a unique signaling protocol and a switching protocol for interconnecting the trunked transmission communications systems into a wide area network that provides an expanded feature set of radio communications capabilities. The trunked radio repeater system including a protocol supporting communications for repeaters and/or subscribers conducting communications using existing protocols, such as the Logic Trunked Radio (LTR) protocol and supporting additional special functions.

35 Claims, 20 Drawing Sheets

U.S. PATENT DOCUMENTS

| | | | |
|---|---|---|---|
| 4,517,669 A | 5/1985 | Freeburg et al. | 370/329 |
| 4,525,832 A | 7/1985 | Miyao | 370/458 |
| 4,525,837 A | 7/1985 | Tan et al. | 370/395 |
| 4,534,061 A | 8/1985 | Ulug | 455/17 |
| 4,553,262 A | 11/1985 | Coe | 455/15 |
| 4,565,903 A | 1/1986 | Riley | 379/201 |
| 4,578,815 A | 3/1986 | Persinotti | 455/15 |
| 4,603,418 A | 7/1986 | Townsend | 370/449 |
| 4,612,415 A | 9/1986 | Zdunek | 455/454 |
| 4,636,791 A | 1/1987 | Burke et al. | 340/825.52 |
| 4,646,345 A | 2/1987 | Zdunek et al. | 455/509 |
| 4,649,567 A | 3/1987 | Childress | 455/17 |
| 4,658,435 A | 4/1987 | Childress et al. | 455/17 |
| 4,670,905 A | 6/1987 | Sandvos et al. | 455/524 |
| 4,670,906 A | 6/1987 | Thro | 455/525 |
| 4,672,601 A | 6/1987 | Ablay | 370/277 |
| 4,672,608 A | 6/1987 | Ball et al. | 370/346 |
| 4,672,657 A | 6/1987 | Dershowitz | 455/414 |
| 4,677,656 A | 6/1987 | Burke et al. | 455/403 |
| 4,682,367 A | 7/1987 | Childress et al. | 455/17 |
| 4,692,945 A | 9/1987 | Zdunek | 455/17 |
| 4,698,805 A | 10/1987 | Sasuta et al. | 370/327 |
| 4,701,944 A | 10/1987 | Howard et al. | 455/518 |
| 4,712,229 A | 12/1987 | Nakamura | 455/465 |
| 4,716,407 A | 12/1987 | Borras et al. | 340/825.04 |
| 4,718,108 A | 1/1988 | Davidson et al. | 455/17 |
| 4,723,264 A | 2/1988 | Sasuta et al. | 455/410 |
| 4,730,187 A | 3/1988 | Menich et al. | 340/825.5 |
| 4,775,998 A | 10/1988 | Felix et al. | 455/450 |
| RE32,789 E | 11/1988 | Lynk, Jr. et al. | 455/512 |
| 4,817,190 A | 3/1989 | Comroe et al. | 455/11.1 |
| 4,831,373 A | 5/1989 | Hess | 340/825.03 |
| 4,833,701 A | 5/1989 | Comroe et al. | 455/509 |
| 4,835,731 A | 5/1989 | Nazarenko et al. | 455/508 |
| 4,843,633 A | 6/1989 | Menich et al. | 455/422 |
| 4,870,408 A | 9/1989 | Zdunek et al. | 340/825.03 |
| 4,870,699 A | 9/1989 | Garner et al. | 455/76 |
| 4,876,738 A | 10/1989 | Selby | 455/435 |
| 4,887,265 A | 12/1989 | Felix | 370/333 |
| 4,903,321 A | 2/1990 | Hall et al. | 455/515 |
| 4,905,234 A | 2/1990 | Childress et al. | 370/349 |
| 4,905,302 A | 2/1990 | Childress et al. | 455/515 |
| 4,905,305 A | 2/1990 | Garner et al. | 455/183.2 |
| 4,926,496 A | 5/1990 | Cole et al. | 455/77 |
| 4,939,746 A | 7/1990 | Childress | 455/509 |
| 4,972,460 A | 11/1990 | Sasuta | 455/519 |
| 4,977,589 A | 12/1990 | Johnson et al. | 379/190 |
| 5,014,345 A | 5/1991 | Comroe et al. | 455/519 |
| 5,020,130 A | 5/1991 | Grube et al. | 455/9 |
| 5,020,132 A | 5/1991 | Nazarenk et al. | 455/17 |
| 5,054,068 A | 10/1991 | Hess et al. | 380/270 |
| 5,054,109 A | 10/1991 | Blackburn | 455/17 |
| 5,077,828 A | * 12/1991 | Waldroup | 455/514 |
| 5,125,102 A | 6/1992 | Childress et al. | 455/9 |
| 5,128,930 A | 7/1992 | Nazarenko et al. | 370/340 |
| 5,133,080 A | 7/1992 | Borras | 455/9 |
| 5,134,714 A | 7/1992 | Janzen et al. | 455/512 |
| 5,159,701 A | 10/1992 | Barnes et al. | 455/15 |
| 5,172,396 A | 12/1992 | Rose, Jr. et al. | 375/356 |
| 5,175,866 A | 12/1992 | Childress et al. | 455/8 |
| 5,203,015 A | 4/1993 | George | 455/514 |
| 5,212,724 A | 5/1993 | Nazarenko et al. | 455/560 |
| 5,265,093 A | 11/1993 | Dissosway et al. | 370/327 |
| 5,274,837 A | 12/1993 | Childress et al. | 455/7 |
| 5,274,838 A | 12/1993 | Childress et al. | 455/9 |
| 5,282,204 A | * 1/1994 | Shpancer et al. | 370/341 |
| 5,363,427 A | 11/1994 | Ekstrom et al. | 455/426 |
| 5,371,780 A | 12/1994 | Amitay | 455/450 |
| 5,465,386 A | * 11/1995 | Barnes et al. | 455/15 |
| 5,613,201 A | 3/1997 | Alford et al. | 455/18 |
| 5,815,799 A | * 9/1998 | Barnes et al. | 455/15 |
| 5,901,341 A | * 5/1999 | Moon et al. | 455/9 |

\* cited by examiner

| # BITS: | 9 | 24 | 7 |
|---|---|---|---|
| FIELD: | SYNC | INFORMATION CONTENT | CHECKSUM |
| CODE: | 158H | | |

FIG. 8A

| # BITS: | 3 | 40 | 40 | | 40 | 1 OR 2 |
|---|---|---|---|---|---|---|
| FIELD: | FRONT PORCH | DATA WORD | DATA WORD | · · · | DATA WORD | BACK PORCH |
| CODE: | 001 | | | | | XX |

FIG. 8B

METHOD AND APPARATUS FOR TRUNKED RADIO REPEATER COMMUNICATIONS WITH BACKWARDS COMPATIBILITY

CLAIM OF BENEFIT UNDER 35 U.S.C. 119(e)

This patent application claims the benefit of earlier filed provisional patent application U.S. Ser. No. 60/047,843, filed May 28, 1997, according to 35 U.S.C. 119(e).

FIELD OF THE INVENTION

The present invention relates generally to trunked radio communications systems, and in particular to a method and apparatus for trunked radio repeater communications with new and existing protocols.

BACKGROUND OF THE INVENTION

Mobile radio communication systems provide for two way radio communications between a central control station and a fleet of cars, trucks, or other vehicles. Typical users of mobile radio communication systems include, for example, police departments, fire departments, taxi services, and delivery services. Present mobile radio communication systems can be configured to provide for radio communications between the control station and all vehicles in a fleet, between the control station and selected vehicles in the fleet, or between different individual vehicles or groups of vehicles within a fleet.

Conventional mobile radio communication systems are typically organized with a number of vehicles and a control station assigned to a single common channel for a given coverage zone. A user assigned to the common channel must wait until no one else is transmitting on that channel before sending a message, because only one transmission at a time can be processed by a single channel. Even when a transmission is addressed to only one user in a conventional system (and therefore not heard by other users), the other users in the system must wait until that transmission is completed before they can use the system to communicate.

Mobile radio communication systems using transmission trunking are an improvement over conventional mobile radio communication systems in that trunked systems enable two or more users to communicate on the system at the same time. For instance, the dispatch console in a transmission trunked communication system can be communicating with one of the vehicles in the fleet; while, at the same time, two other vehicles in the fleet can be using the same trunked system to communicate with each other. Transmission trunked communication systems group a number of channels for the same coverage zone together into a single audio communication system, with each channel accessible to each user in the system. Because each user will only need to communicate over the trunked system part of the time, and because it is unlikely that all users will need to communicate at precisely the same time, the number of channels assigned to a trunked system group can always be less than the number of users allocated to that trunked system group.

The United States Federal Communications Commission (FCC) has assigned 600 channels in the 800 MHZ band for trunked land mobile use. Each channel is comprised of a pair of assigned frequencies, a mobile transmit frequency and a repeater transmit frequencies. Mobile transmit frequencies are 806–821 MHZ, with the repeater transmit frequencies exactly 45 MHZ above the corresponding mobile transmit frequency, or 851–866 MHZ. Channel spacing is 25 KHz, with the maximum allowed deviation between channels being ±5 KHz. In September 1987, the FCC also allocated 399 channels in the 900 MHZ band for trunked land mobile use. Mobile transmit frequencies are 896–901 MHZ, with the repeater transmit frequencies exactly 39 MHZ above the corresponding mobile transmit frequency, or 935–940 MHZ. Channel spacing is 12.5 KHz, with the maximum allowed deviation between channels being ±2.5 KHz.

In transmission trunked communication systems, a signaling protocol is used to send and receive control signals among users on each channel in the trunked system and a switching protocol is used to establish which channels those users will be communicating over. The preferred conventional transmission trunked communication system uses a signaling protocol that transmits the control signals in the subaudio band simultaneously with the transmission of voice or data information signals. Signaling protocols that can communicate control signals within the constraints of the subaudio band are preferred, because use of the subaudio band precludes the need for using a dedicated channel for transmitting the control signals (thereby reducing the number of available channels in the trunked system for voice and data communications). A switching protocol is used by the trunked system to automatically find and engage an open channel when a user initiates a transmission. To maximize the trunking capabilities of such a system, the switching protocol must efficiently allocate channels in the trunked system and avoid channels that are already in use at the time the transmission is initiated. For further explanation of the preferred conventional transmission trunked communication systems, reference is made to the description of the operation of the ClearChannel LTR® system contained in the manual entitled "E. F. Johnson ClearChannel LTR Application Note", Part No. 009-0001-020 (Rev. 5, October 1988), available from E. F. Johnson Company, Waseca, Minn., which is fully incorporated by reference herein.

A substantial amount of LTR-compatible equipment is currently in use, however, the LTR system does not provide modern network-based communication functionality. For example, the LTR protocol is limited and does not support new and special functions for network-based communications. Furthermore, the LTR protocol does not support advanced channel selection functions.

Another drawback of the LTR system is that LTR communications are conducted on a predetermined set of fixed transmission frequencies. Therefore, the number of communication channels available at any given time in an LTR system are fixed. Additionally, the receive and transmit channels in an LTR system are always at a predetermined offset frequency. Therefore, the LTR protocol does not provide flexible use of communications bandwidth.

Yet another drawback of the LTR system is that it was designed to accommodate a limited number of subscribers and a predetermined number of commands. Modem communication networks provide a number of new features which cannot be exercised using mature communication protocols, such as LTR.

New transmission trunked communications systems have been proposed which incorporate advances in network communications. For example, the E. F. Johnson MULTINET (tm) system, part of which is described in U.S. Pat. No. 5,159,701 to Barnes, et al., provides for, among other things, distributively interconnecting a plurality of land mobile trunked transmission communication systems into a wide area network. However, this system is not compatible with traditional LTR systems.

There is a need in the art for a trunked radio repeater communication system which provides sophisticated network-based communications. This system should provide flexibility to channel assignments for both reception and transmission frequencies. The system should also provide for a large number of subscribers. Also, the system should support a variety of new commands and features. Finally, the system should support and allow for LTR communications such that existing LTR subscribers can communicate in the system with minimal interference issues.

SUMMARY OF THE INVENTION

The present invention satisfies the aforementioned and other needs by providing a trunked radio communication repeater system including a protocol for communications by a large number of users. In one embodiment, the protocol includes a plurality of word formats for communications between one or more repeaters and the or more subscribers, each word format including a synchronization code for receiver synchronization, a type code indicating a first word format and a second word format and compatible with protocols using an area code to identify subscribership to a particular repeater site, and a checksum code to error check communicated words; where the first word format further includes a channel in use code to identify a channel in use, a home code identifying a home channel, a group code providing a code for one or more groups of subscribers, and a free code identifying a free channel; and wherein the second word format further includes function specific codes to perform a plurality of functions. In one embodiment, the communications protocol is compatible with Logic Trunked Radio (LTR) communications. In one embodiment, the first word format supports Logic Trunked Radio (LTR) communications. In yet another embodiment, the channel in use code is used to provide receive channels and transmit channels. In another embodiment, the receive channels and transmit channels have programmable relative offsets. In one embodiment, a checksum is inverted for identification of communications between subscribers and repeaters.

In one embodiment, the communications protocol provides for communications by subscribers and/or repeaters incorporating either the logic trunked radio (LTR) protocol or one embodiment of the present protocol.

In one embodiment, the type code comprises a type bit matching a Logic Trunked Radio (LTR) AREA code of a repeater site for transmissions of words according to the first word format, the type bit inverted for transmissions of the second word format. In yet another embodiment, the type code comprises a type bit matching a Logic Trunked Radio (LTR) AREA code of a repeater site for transmissions of words according to the second word format, the type bit inverted for transmissions of the first word format.

Alternate embodiments provide a number of additional features. For example, one embodiment of the system provides home channel aliasing. One embodiment of the system provides call grouping.

This summary is not exhaustive or complete and the embodiments described herein are too numerous to mention in the summary. Furthermore, the scope of the present invention is determined by the appended claims and their equivalences.

BRIEF DESCRIPTION OF THE DRAWINGS

FIG. 8A is a block diagram showing a generic word format according to one embodiment of the present invention.

FIG. 8B is a block diagram showing a datastream according to one embodiment of the present invention.

DETAILED DESCRIPTION

In the following detailed description of the preferred embodiment, references are made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. The following detailed description is, therefore, not to be taken in a limiting sense, and the scope of the present invention is defined by the appended claims and equivalents thereof.

The complete specifications of the following patents and patent applications are incorporated by reference in their entirety:

U.S. Pat. No. 5,159,701, entitled: METHOD AND APPARATUS FOR A DISTRIBUTIVE WIDE AREA NETWORK FOR A LAND MOBILE TRANSMISSION TRUNKED COMMUNICATION SYSTEM, issued Oct. 27, 1992;

U.S. Pat. No. 5,040,237, entitled: RADIO TRUNKING FAULT DETECTION SYSTEM, issued Feb. 20, 1990;

U.S. patent applications Ser. No. 08/400,854, filed Mar. 8, 1995, and Ser. No. 08/693,557, filed Aug. 7, 1996, now U.S. Pat. No. 5,815,799, both entitled: PRIORITY SYSTEM FOR A WIDE AREA TRANSMISSION TRUNKED COMMUNICATION SYSTEM;

U.S. Provisional Patent Application Ser. No. 60/047,843, filed May 28, 1997, entitled IMPROVED REPEATER COMMUNICATIONS PROTOCOL; and U.S. patent application Ser. No. 09/058,687, filed Apr. 10, 1998, entitled: TRUNKED RADIO REPEATER COMMUNICATION SYSTEM INCLUDING HOME CHANNEL ALIASING AND CALL GROUPING.

A trunked radio system, as defined by the FCC, is a "method of operation in which a number of radio frequency pairs are assigned to radios and base stations in the system for use as a trunk group". Trunking is the pooling of radio channels where all users have automatic access to all channels reducing waiting time and increasing channel capacity for a given quality of service.

Trunking concepts are based on the theory that individual subscribers use the system a small percentage of the time and that a large number of subscribers will not try to use the system at the exact same time.

The present communications system is flexible and provides support for LTR communications, since both LTR radios and radios embodying the present protocol may operate within the system. Therefore, a discussion of the features of LTR systems provides insights to the advantages of the system of the present invention and the work required to make the system understand the LTR communications.

LTR System

Figure 2:
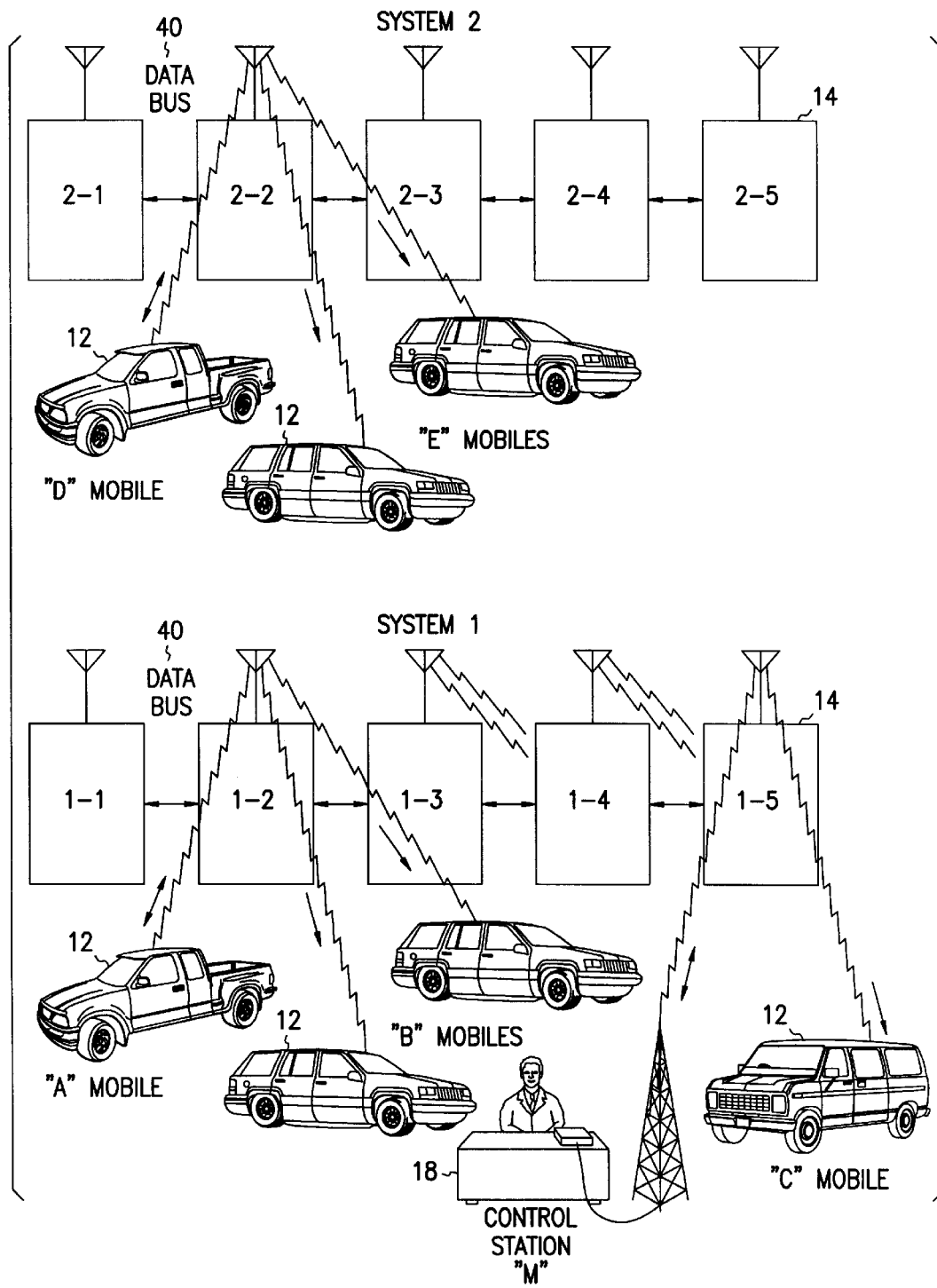
FIG. 2 is a pictorial representation of a multiple site conventional transmission trunked land mobile communication system.
Figure 4:
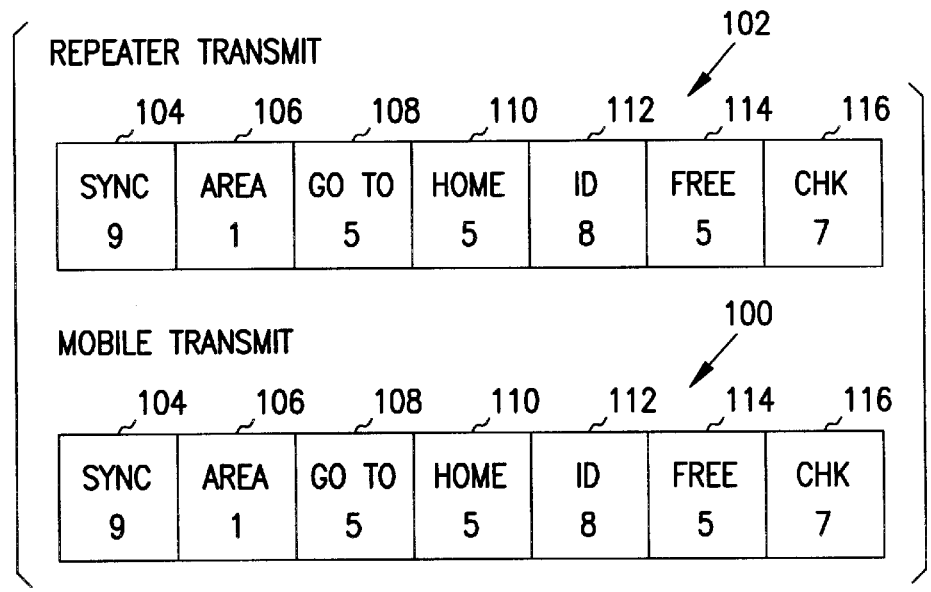
FIG. 4 is a block diagram of an over the air control message used in a conventional transmission trunked land mobile communication system.
Figure 5:
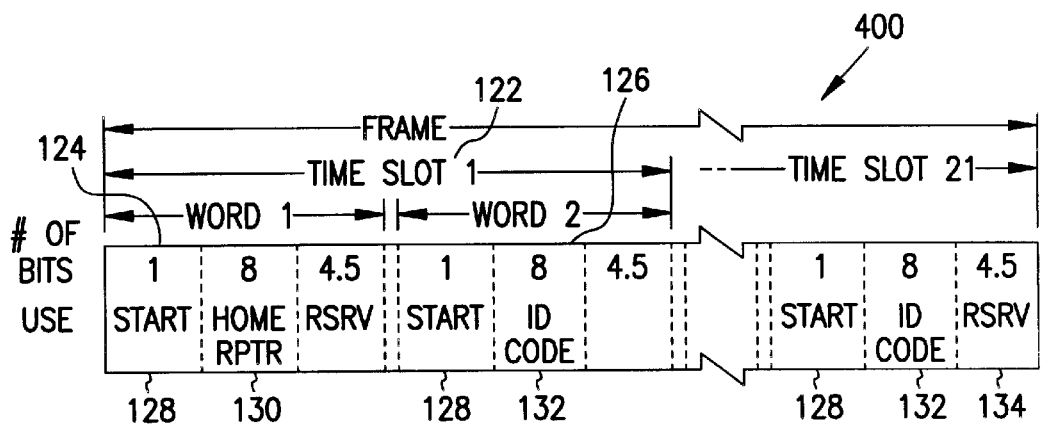
FIG. 5 is a diagram of the time slot bus used to connect repeaters in a conventional transmission trunked land mobile communication system.

FIGS. 2, 4, and 5 show aspects of an LTR (Registered TM) system for land mobile trunked transmissions. The LTR (Registered TM) signaling protocol was first introduced into the United States market in 1980 and has since become the de facto transmission trunking standard. Familiarity with the LTR system, including the LTR signaling protocol, the LTR repeaters and the various LTR compatible mobile transceivers can be obtained from a review of the previously incorporated reference and is presumed for the discussion that follows.

In the LTR configuration shown in FIG. 2, the mobile transceiver 12 (Mobiles A, B and C) and the control station 18 of System 1 cannot communicate with the mobile transceiver 12 (Mobiles D and E) of System 2. The repeater 14 uses a time slot bus 40 that indicates which channels are free and which channels are busy in the System. The time slot bus 40 allows the Mobiles in either System 1 or System 2 only to communicate with each other within their respective system by identifying a free channel and communicating together on the repeater 14 associated with that channel. The time slot bus 40, combined with the LTR control message format described below, limits communication between repeaters in the LTR system to a method for assigning free channels in a group of channels (repeaters) that comprise a given trunked system. There is no provision to communicate information signals (voice/data communication) among repeaters in a trunked system, let alone communicate information signals between repeaters located in different trunked systems.

The control message formats 100 and 102 for the LTR signaling protocol are shown in FIG. 4. In the LTR system shown in FIG. 2, system control is accomplished by sending control messages 100 and 102 between repeater 14 and mobile transceivers 12 and control stations 18. Control message signaling occupies the subaudio frequencies below 150 Hz of a channel and occurs even when voice or data information is present on the channel. Control messages 100 are continuously transmitted to the repeater 14 by the calling mobile transceiver 12 while a conversation is in progress. The repeater 14 also continuously transmits control messages 102 to the called mobile transceiver 12, as well as to all other mobile transceivers 12 monitoring that channel. The specific information in the control message 100 and 102 depends on whether it is repeater or mobile transmitted. The width of each bit in the control message is 3.36 msec (a data rate of approximately 300 baud) and a complete control message for the LTR signaling protocol is transmitted in approximately 135 msecs.

The data fields in control messages 100 and 102 include:

Sync 104—The first two bits are used to initialize the receive data circuitry of the mobile transceiver. The other bits are used to detect the arrival of the control message 100 and provide bit synchronization.

Area 106—With mobile transmitted control messages 100, this is the area programmed in the mobile; with repeater transmitted control messages 102 messages, it is the bit programmed by the repeater programming switch. If the area transmitted in a control message does not agree with the programmed area, the call attempt will be unsuccessful. This bit is usually coded "0" unless there are two LTR systems close enough to interfere with each other. In that case, it would then be coded "0" in one trunked system and "1" in the other trunked system.

Go-To 108—In a control message 100 from the mobile, this field contains the number of the repeater (1–20) to which the message is being transmitted. These bits must be the same as the number assigned to the repeater or the message is appearing on the wrong channel because of intermodulation and will be ignored. In control message 102 from the repeater to the mobile, this field contains the repeater number. In control messages to mobiles being trunked out to other repeaters, this field contains the repeater number (channel) to which those mobiles should switch to receive a message. If the repeater is not busy, a control message 102 is transmitted every 10 seconds to keep the mobiles updated. The Go-To 108 field then contains the number of the repeater. When the mobile push-to-talk switch is released, the transmitter remains on for a short time and sends a turn-off code in this field. This code is retransmitted by the repeater and it tells the receiving mobiles to squelch and resume monitoring the home channel. This prevents a "squelch tail" (noise burst) when the transmitting mobile unkeys.

Home Repeater 110—In a mobile-to-repeater control message 100, this field contains the home repeater number of the mobile being called. This number is always the programmed home repeater number in the selected system of the mobile making the call. In a repeater-to-mobile control message 102, this field contains the same repeater number received in the data message from the mobile. If the repeater is not busy, it transmits its own number in this field.

ID Code 112—In a mobile-to-repeater control message 100, this field contains the ID code (1–250) of the fleet or sub-fleet being called. In a repeater-to-mobile control message 102, this is the ID code of the fleet or sub-fleet being called on that channel. If other mobiles assigned to that channel have been trunked to other repeaters, additional messages are transmitted containing the ID code of these mobiles. In this case, the ID code information is from the repeater time slot bus 40.

Free Channel 114—In a mobile-to-repeater control message 100, this field contains a pass code. In a repeater-to-mobile control message 102, this field contains the number of a repeater that is not busy and is available for service. The free repeater is chosen in a random manner as described in the next section. This information tells mobiles assigned to that repeater which repeater to use to make a call. If a repeater is not busy, it transmits its number in this field. If all repeaters are busy, a "0" is transmitted in this field.

Error Check Bits 116—These seven bits are used as a checksum to check for data errors in a data message. If an error is detected, the message is rejected.

A portion of the LTR switching protocol is shown in FIG. 5. In a LTR transmission trunked communication system, a single-line serial bus interconnects the logic units of all the repeaters in the trunked system. The serial bus is time-divided to act as a time slot bus 120. One repeater in the system is programmed to generate a synchronization pulse that is used by all other repeaters in the system to determine their time slot 122 on the time slot bus 120. Time slots 1–20 are used by the respective repeaters and time slot 21 is used by the ID Validator. The time slot 122 used by each repeater is determined by the repeater number assigned to that repeater when the programming switch is set. For example, Repeater 1 uses time slot 1, repeater 5 uses time slot 5, and so on. The data rate on the time slot bus 120 is 18,750 baud.

During its time slot 122, each repeater places information on the time slot bus 120 indicating the status of that repeater. The time slot 122 consists of a first word 124 and a second word 126. If a repeater is not busy, only the start bits 128 appear in the time slot 122. If a repeater is busy, information appears in its time slot 122 identifying the home repeater 130 and ID code 132 of the mobile being called on that channel. If a repeater number is unassigned, nothing appears in the time slot 122. Each repeater monitors all the time slots and if that repeater's number is detected in another time slot, the repeater begins transmitting an additional control message using the signaling protocol described above. This message tells a mobile to go to another channel to receive a message. This additional message is transmitted for as long as the mobile is transmitting on the other channel.

The free repeater indicated in the Free Channel 114 field of control message 102 as shown in FIG. 4 is determined by continuously monitoring information in the twenty time slots 122. The free repeater number changes as these slots are monitored. If a time slot 122 has only start bits 128 indicating an idle repeater, that is the current free repeater. If information in a time slot 122 indicates no repeater or a busy repeater, the free repeater number does not change. For example, assume a five repeater system with repeaters assigned numbers 1, 5, 9, 13, and 17. If repeaters 5 and 13 are busy, the free repeater changes as follows as the twenty time slots are monitored: 1 1 1 1 1 1 1 1 1 9 9 9 9 9 9 9 9 17 17 17 17. The free repeater transmitted in the Free Channel 114 field of control message 102 is the free repeater detected at the instant the message is composed.

NP System

Next, embodiments of the present communications system will be discussed. According to one embodiment of the present invention, communications are conducted by subscribers communicating with repeaters. For the purposes of this description, a subscriber shall include, but not be limited to, a portable radio, a mobile radio, and a handheld radio. Repeaters in the present system conduct communications which are compatible with an LTR repeater in which a logic module performs the call functions and communicates over the air to the subscriber(s). Each repeater provides a radio frequency (hereinafter "RF") channel and each repeater contains a logic module responsible for signaling on its own channel. Logic modules then share information with all other repeaters in the system via inter-repeater communications.

System control is accomplished by the exchange of data messages between subscriber and repeater. In one embodiment, the system trunks up to 20 channels by utilizing continuous subaudible digital data applied to the RF carrier simultaneously with voice modulation. Therefore, no dedicated control channel is required and all channels are used for voice communications for system efficiency. Each radio is assigned a home channel which will send system commands to specified radios. In the messaging protocol, there are normal words and special function words. The special function words are used to initiate special calls; telephone, unique ID, and data by unique ID. The special function words are also used for command calls, such as: interrogate, kill, reassign, electronic serial number authentication, registration, and de-registration.

The present system may be used in a "locality". A locality includes a set of repeaters interconnected together to pool the channels in a trunked channel group at a physical site or location. In one embodiment of the present system, each locality has a Status channel. The Status channel is used to convey traffic on the system for repeater backup purposes. The Status channel additionally transmits continuously for subscriber units that are roaming. The Status channel may also be used for voice communications at any time.

Since each repeater is responsible for signaling on its own channel, this approach lends itself well to a distributed processing logic controlled approach requiring only a small logic unit within each repeater. These processors share information over a communication path. This architecture permits each repeater to be autonomous. A failure in one repeater leaves the remainder of the system intact and running.

In one embodiment, the repeaters are connected to a larger system infrastructure. This allows the system to perform some of the aforementioned calls. The system is capable of communicating from one infrastructure set to another. In such an embodiment, the system infrastructure may be centrally located or distributed at each site or "locality".

The present system may be used for trunked communications using all available bands, including, but not limited to, VHF, UHF, 800 MHz and 900 MHz trunking bands. Alternate embodiments include, but are not limited to, auto registration, UID tracking, site tracking, group tracking, de-registration, UID calling, including telephone company and auxiliary tracking, and channel numbering update.

Figure 1:
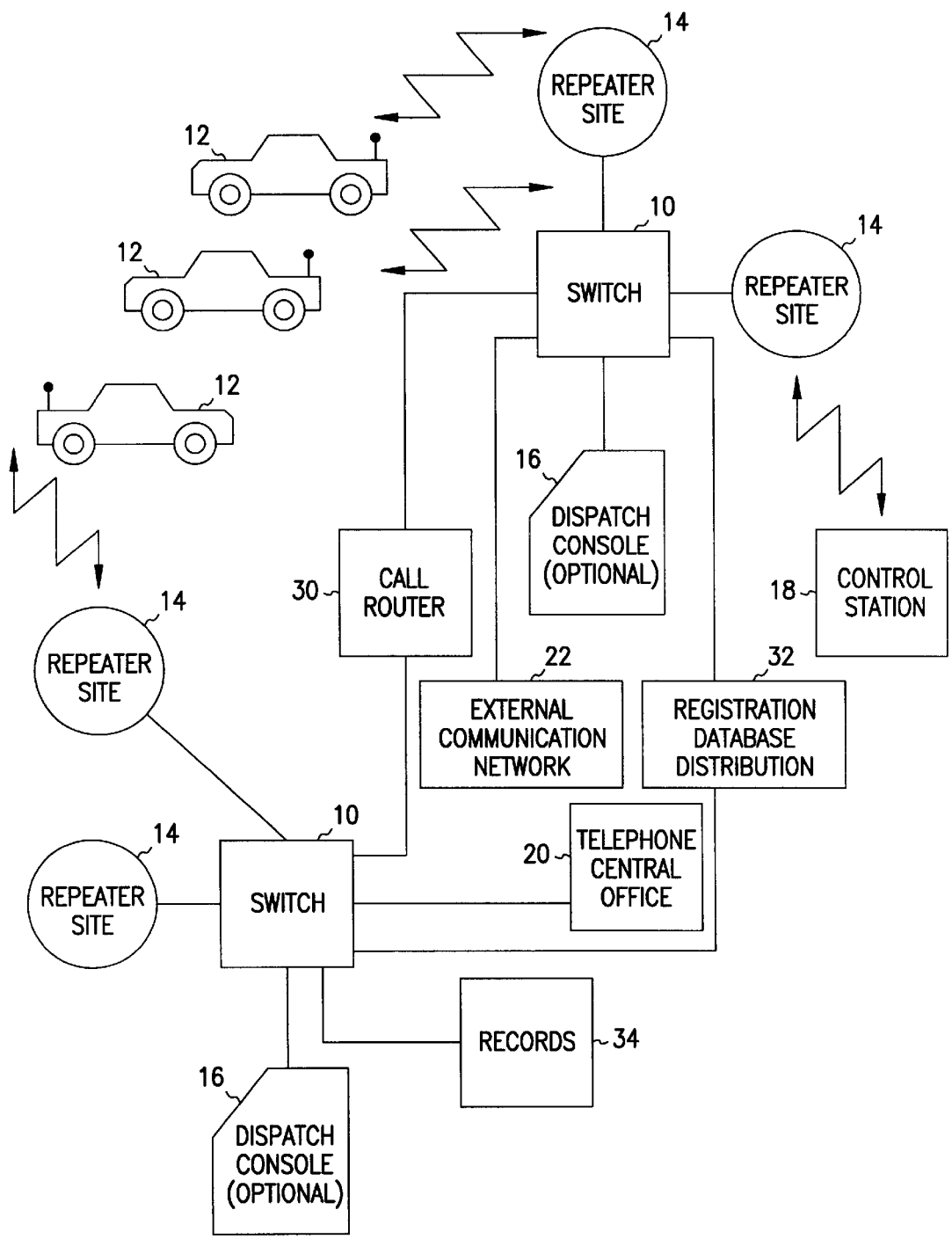
FIG. 1 is a block diagram a land mobile trunked radio communication system using switches, according to one embodiment of the present system.

FIG. 1 is a block diagram of a land mobile trunked radio communication system using switches 10, according to one embodiment of the present system. The switches 10 utilize a unique signaling protocol and a switching protocol adapted for communication of control signals in the subaudio band. A call router 30 interconnects subsystems, each of which includes, but is not limited to, a switch 10, a plurality of subscribers 12 for transmitting and receiving transmission trunked radio communications over one or more channels, and a plurality of repeaters 14. In one embodiment, the transmission trunked radio communications comprise an information signal and a control signal using transmission trunking, with the control signals transmitted simultaneously in the subaudio range on the same channel over which the information signals are transmitted. Switch 10 is used for selectively interconnecting two or more of the repeaters 14 in each trunked subsystem, as well as providing the link between other trunked systems in a wide area network.

In one embodiment, switch 10 is connected to a dispatch console 16 for monitoring the users of subscribers 12 and dispatching calls and other communications. Alternatively, a remotely located control station 18 is used to perform the dispatching function on the system. The control station 18 may include a selective call console and communications with the repeater 14 by way of radio communication to the link of the switch 10, rather than via a direct or hard-wired connection with the switch 10. In addition, switch 10 may be connected with the telephone central office 20 or an external communication network 22 (e.g., a satellite communication system or a private PBX system) to allow users on the system to make and receive communications or calls outside of the network.

In one embodiment, two or more switches 10 are interconnected by a call router 30 that operates as a high speed voice grade communication path between the switches 10. The call router 30 may be any type of matrix switching equipment or PABX that is capable of handling directed voice switching. Switch 10 may also be interconnected to a registration database 32 for maintaining a database of registration information that can be communicated among the switches 10 as a subscriber 12 moves from coverage zone to coverage zone. Additionally, one or more of the switches 10 may be connected to a record monitor 34 for monitoring activity on the network and performing record keeping, billing, and other accounting information functions. The activities of the call router 30, the registration database 32, and the record monitor 34 may be contained within a single computer linked to each of the switches 10, or may be distributed among several processors linked to one or more of the switches 10, depending upon the type of configuration and the functions that are required of a particular user's network.

The operation of an independent transmission trunked communication system associated with each switch 10 for one embodiment of the present system will now be described. Control signaling between the repeaters 14 associated with a switch 10 and the subscriber 12 is done with subaudio control signals on each channel designated as a "home channel". Each subscriber 12 in the trunked system is assigned to a home channel that it monitors when the subscriber 12 is not involved in a call. Subscriber 12 receives control signal instructions over the home channel to either stay on the home channel and open its audio to receive a call, or to change to a different channel and open its audio to receive a call. If the subscriber 12 is sent to another channel to receive a call, it will return to its home channel as soon as the call is completed.

When a subscriber 12 wants to initiate a call, all the operator has to do is depress the push-to-talk (PTT) button and hold it. If the home channel assigned to subscriber 12 is available, the transmitter for subscriber 12 will transmit a control signal on the home channel frequency telling the repeater 14 that a call is being setup on that channel. At that point, the subscriber 12 turns its transmitter off and waits for a return message from the repeater 14. If the repeater 14 is not busy, the repeater 14 will broadcast a handshake message that will be received by all subscribers 12 assigned to the same home channel. The operator of the initiating subscriber 12 will hear an audible proceed tone and its transmitter will be enabled to proceed with the call. For this type of group calling, all other subscribers 12 with the correct group identification will remain on the channel and open their squelch to receive the call. All subscribers 12 that did not have the proper group identification would remain muted, but the logic unit of these subscribers 12 would receive and store the control signal indicating that their home channel is now busy and that they would get a free channel assignment. As a result, if a subscriber 12 not involved in the call described above now wanted to initiate a call, it would know where a free channel was so that it would not have to look for a free channel in the trunked system.

If the home channel for a subscriber 12 was busy when a call was initiated, the initial data transmission would be made on the free channel that it had stored in memory. The repeater 14 receiving the call would notify the repeater 14 for the home channel assigned to the subscriber 12 initiating the call that a call was being setup on the free channel for a group assigned to the home channel repeater 14. The home channel repeater 14 would then add this information to the control signal being sent out over the home channel, and would also change the free channel assignment to another free channel. The subscriber 12 that had a proper group assignment would receive the control signal sent out over the home channel that a call was being setup for their group on the directed channel and would switch to that channel and open their squelch to receive the call. All other groups 12 that did not have the proper group assignment would store the free channel information and would continue to monitor the home channel.

In one embodiment, a distributive approach to networking trunked systems is utilized which reduces the overhead involved in managing the network and the trunked systems and increases the reliability of the network. In this way, reliance on critical components is eliminated and backup is provided to insure that communications over the network and the trunked systems are maintained.

Figure 3:
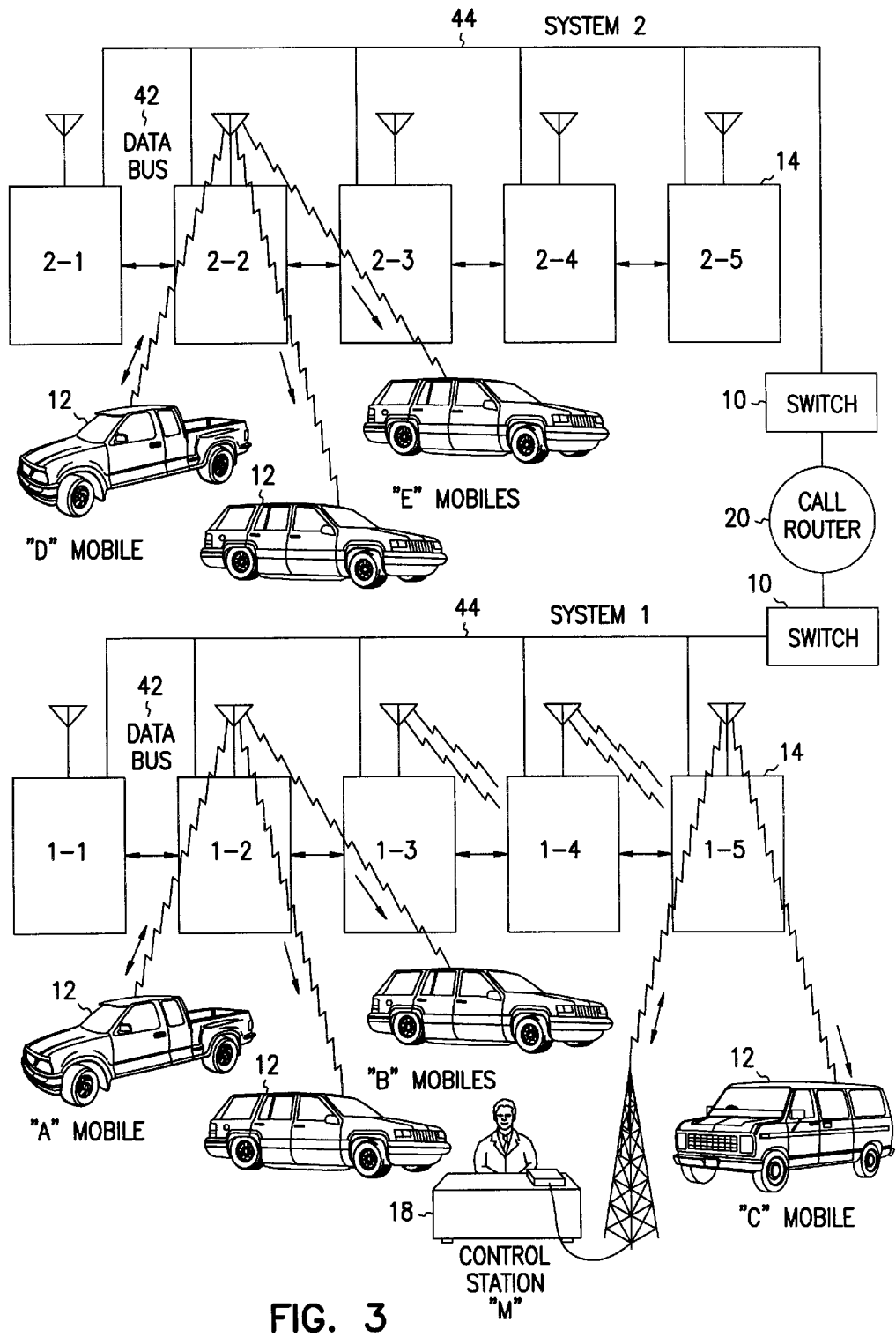
FIG. 3 is a pictorial representation of a transmission trunked land mobile communication system using switches and a call router, according to one embodiment of the present system.

In the transmission trunked communication system shown in FIG. 3, each of the repeaters 14 is interconnected with a high speed data bus 42 that provides for an improved switching protocol that allows data words to be communicated among the repeaters 14. The control message format of the signaling protocol of the present invention provides a unique identification for each subscriber 12 and additional network based functionalities. Additionally, each of the repeaters 14 is connected by a network bus 44 with the switch 10 for the respective trunked system. As described in greater detail hereinafter, the network bus 44 allows information signals to be communicated among repeaters in a system, as well as allowing both control and information signals to be communicated with another switch 10, or with an external communication network, i.e., a telephone exchange.

The signaling and switching protocols of the present system enable transmissions to be LTR compatible, yet provide network-based functionalities and additional features. The protocols enable multiple systems of repeaters to be grouped together in a wide area, transmission trunked radio communication system. In addition, an expanded feature set is provided that supports features beyond those features currently available on LTR transmission trunked communication systems. The result is a mobile transmission trunked communication system wide area network that does not need a dedicated control channel because the control signals are transmitted subaudibly, simultaneously with the information signals, that provides a fast access time through the system (approximately 0.3 secs) that will not increase as the number of channels in a system are increased, that provides continuous control signaling to enable mobiles just brought into service or coming out of a fade to begin monitoring a call automatically (this is imperative in public safety systems where the risk of loss of communication in an emergency situation is critical), that has a signaling protocol that is frequency transparent and can be used on different frequency bands, that provides unique identification numbers for each mobile on the entire system, and that encodes the trunked transmissions to prevent unauthorized reception.

The present protocol is designed to be compatible with radios and repeaters which communicate using the LTR Over-The-Air Protocol. In one embodiment, access times are within the specified times for LTR systems for normal group calls. One embodiment of a general format for each word is shown in FIG. 8A. In this embodiment, each word contains a 9 bit SYNC synchronization code followed by 24 bits of Information Content data, and a 7 bit Checksum code.

In one embodiment, the SYNC code includes two bit initialization code followed by a seven (7) bit Barker code. For example, a "1 0" binary sequence may be used to initialize the data recovery circuitry of a receiver. The remaining Barker bits are useful for achieving bit and word synchronization. In this example, the SYNC code has a hexadecimal representation of 158H. The Information Content data varies depending on whether the word contains an LTR compatible command or whether the word supports new functions not recognized by LTR compatible radios. The Checksum field is a checksum computed on the 24 bits of Information Content data. Checksum information is used for error detection.

One embodiment of the present protocol uses "normal" and "special function" words. In one embodiment of the present system, a single bit of the Information Content data is used as a TYPE code to identify whether a word is "normal word" or "special function word." Normal words provide standard LTR group calls and special function words are used to support functions which are not supported by the LTR protocol. The special function words provide flexibility in the word formats and allow for future expansion with new features.

In one embodiment of the present protocol, the TYPE code depends on the LTR AREA bit designation of a locality. In this embodiment, the TYPE code is a single bit (or "TYPE bit") which is set to the Boolean value of the LTR AREA bit for transmission of normal words, and which is set to a second Boolean value for transmission of special function words. Therefore, in a multiple locality system, the TYPE code is not a fixed designation for normal and special function words, but depends upon the LTR AREA bit designation of each locality.

The following discussion of the protocol assumes an LTR AREA bit designation of Boolean zero (0) for the locality, so the TYPE code is a single bit. The TYPE bit designation for transmission of normal words is Boolean zero (0) and the TYPE bit for transmission of special function words is Boolean one (1). Word formats according to one embodiment of the present protocol are provided in FIGS. 6A, 6B, 6C, and 6D. Words 120 and 140 are normal words, identified by a TYPE bit equal to Boolean zero (0). Words 160 and 180 are special function words, identified by a TYPE bit equal to Boolean one (1). In one embodiment, the TYPE bit is located in the same position as the LTR standard AREA bit. Each word is 40 bits long.

Radios using the new protocol or "NP", as provided by embodiments of the present system, are able to conduct LTR compatible communications. For the purposes of this document, references to "LTR" and "standard LTR" relate to the known LTR protocol. References to "new" and "new protocol" or "NP" relate to the protocol provided by the present invention and demonstrated by the embodiments discussed herein. Therefore, an "LTR radio" or a "standard LTR radio" relates to a radio which is programmed to operate using the LTR protocol. A "new radio" or "new protocol radio" or "NP radio" relates to a radio programmed to operate according to the present invention. Furthermore, the term "radio" includes subscribers and repeaters. This nomenclature will facilitate discussion of how the NP system interacts with the LTR transmissions to provide compatibility with LTR radios in the system.

Since the protocols are different, interference issues must be considered to avoid misinterpretation of commands between radios using the various protocols. The present system is designed to permit both LTR and NP communications and addresses the interference issues. For example, in the word formats shown in FIGS. 6A, 6B, 6C, and 6D the actual NP word codes are selected from a limited range such that the words will be ignored by a standard LTR radio to avoid misinterpretation of the words and to avoid providing false commands to standard LTR radios. Furthermore, in this embodiment, an inverted checksum (ICHK) is used to identify NP words transmitted from a subscriber to a repeater to avoid misinterpretation of the words as LTR words. These aspects are discussed in further detail, below.

Normal Words

Figure 6A:
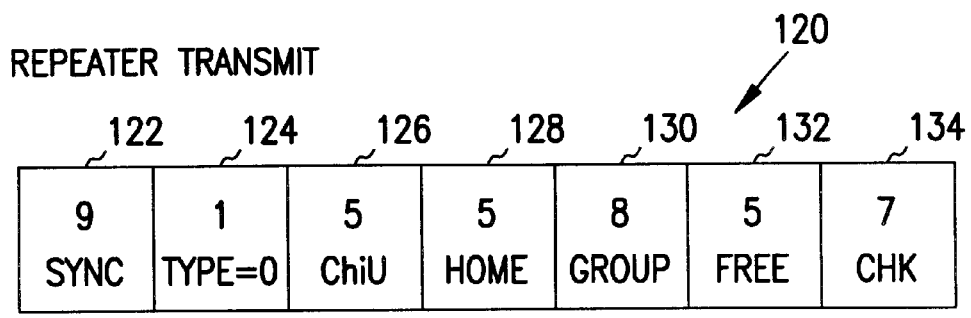
FIGS. 6A, 6B, 6C, and 6D are block diagrams of word formats in accordance with one embodiment of the present system.
Figure 6B:
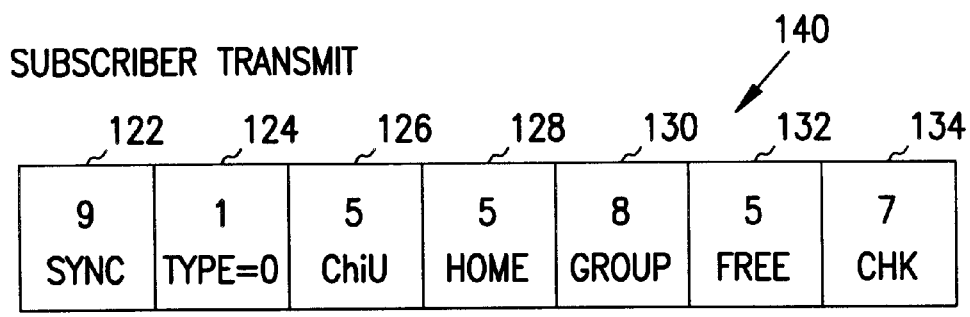

Normal words in the NP protocol include standard group calls which are supported by LTR radios. In FIGS. 6A and 6B, normal words 120 and 140, the SYNC and CHK codes are compatible with the SYNC and CHK codes used in a standard LTR system. Again, this example demonstrates a locality with an LTR AREA designation of Boolean zero (0), because in FIGS. 6A and 6B the TYPE bit is set to Boolean zero (0) for normal words.

The TYPE bit of words 120 and 140 is located in the position of an AREA bit in a standard LTR system, however, the function of the TYPE bit is very different. In LTR systems, the AREA bit is used to distinguish between different repeater sites. The TYPE bit in NP transmissions is used to distinguish normal words as opposed to special function words, however, it is programmed to be consistent with the AREA coding of a site to avoid interference issues with standard LTR transmissions within the system. As stated above, in one embodiment, the TYPE code is set to the Boolean LTR AREA bit designation for normal word transmissions and to a second Boolean value for special function word transmissions. This is explained in further detail in the section entitled Interference Issues, below.

The channel in use code (ChiU) 126 is located in the same bit position as the standard LTR GOTO codes. The ChiU code 126 uses 5 bits to identify a channel number upon which communications are being conducted. In word 120, which is transmitted by a repeater, the ChiU code 126 identifies the repeater (channel) transmitting. If a repeater has little or no traffic a word is transmitted approximately every 10 seconds to keep the mobiles updated as to what repeater they are tuned to. In word 140, which is transmitted by a subscriber, the ChiU code 126 identifies the number of the repeater to which the message is transmitted. The number must be the same as the repeater's, else the word is considered to be transmitted on the wrong channel and ignored.

The ChiU code 126 is also used to send a turn-off command by a subscriber to a repeater. The repeater then squelches the subscribers and instructs them to return to their home channel. This is done to avoid a noise burst or "squelch tail" when the transmitter unkeys.

In one embodiment of the present system, a locality has up to 20 channels. However codes may be used to perform special functions. Channel 30 is a "hang code" indicating the channel is in use but the receive audio should be muted. Channel number 31 is a "turn-off code" indicating that the channel is being freed for other usage. Channel 29 is a "directed group call" that indicates that a subscriber unit is allowed to transmit while receiving a normal group call.

In one embodiment of the present system, the radios are programmable with respect to receive and transmit channel assignments. In one embodiment, transmit channels and receive channels are communicated using the ChiU code. ChiU value indicates a channel offset pair to use; i.e., ChiU 5 would point to a receive offset of 8,190 and a transmit offset of 8,190 which are channels that are 8,190 channels from the associated base frequency. Other means of communication of the channels are possible without departing from the scope and spirit of the present invention, and the examples given herein are provided by way of illustration and not limitation. The channel numbers provide flexibility for receive/transmit channel pairs and are not limited to a predetermined, fixed offset, as in LTR systems. This provides a significant benefit for VHF and UHF communications, where the communications do not always employ a fixed offset between transmit and receive channels. However, additional non-volatile storage for the programmable channel information is required of the subscriber units. The system also is responsible for indication of the channels used at a locality and the transmit/receive frequency offsets from a base channel. The ChiU code words contain the channel number being defined as well as the transmit and receive channel offsets from the base channel number.

The Home Repeater code 128 in word format 140 is the Home repeater number for the subscriber being called. The Home Repeater code 128 in word format 120 is the home repeater number of the subscriber as received from the subscriber. If the repeater is not busy, it transmits its own number in this field.

The Group code 130 is an eight bit number which identifies a particular group to which a subscriber is assigned. In a subscriber to site transmission 140, the Group code 130 contains the identification number of the group being called. In a site to subscriber transmission 120, the Group code 130 contains the number of the group being addressed by the transmission.

The Free code 132 is a five bit number identifying a free channel for communications. In a subscriber to site transmission 140, the Free code 132 is set to the value of 31 for standard LTR and is set to the value of 21 for group calls that are NP protocol only but still normal group calls. This allows the ability to distinguish mobiles that are standard LTR from NP protocol making normal group call communications. This allows the system, repeater or infrastructure switch, to disallow mobiles that are standard LTR and not NP if desired, making normal group calls. In a site to subscriber transmission 120, the Free code 132 is the number of a repeater that is not busy and available for service. If the repeater itself is not busy, then it may transmit its own number. If all repeaters are busy, then a "0" may be transmitted.

Some of the functions supported by the normal words are:

Normal Call

The normal call data format has the Type field set to the same value as the LTR Area bit, typically 0. There are several different data words that fall under the Normal Call word Type. The normal call data word format is compatible with the standard LTR data word. This is what allows compatibility of NP subscribers to standard LTR subscriber units. The Normal Call word format contains the same "Free" channel information content as standard LTR word.

Group ID Call Word

The Group ID Call word is the word that is used for group calling. The group IDs for standard LTR systems range from 1 to 250. In one embodiment of the NP systems, a portion of the range, for example, from 240 to 250, is used for other specific uses or reserved. For example, range 240–247 are used for the Token Group Words in the NP system, as discussed next. This reduction in the Group ID Call range does not significantly impact the operation of Group ID calls, in either LTR systems or NP systems.

Token Group Word

The Token Group word is used in special calls such as telephone, auxiliary or unique ID (UID), and data by UID. This word is provided by the system to the subscriber unit to allow the special call to use a standard style LTR data word to be used once the channel access has occurred between the desired mobile (subscriber) and the repeater (site). This allows the "Free" channel information to be in the continuous word stream. In one embodiment, the Token Group word uses group IDs from 240 to 247.

DONUT Word

The DONUT word (do nothing) is used by the system at the end of a command to hold the channel to allow the mobile unit time to respond while keeping other units off the channel. This is a normal type word and is not a special function type word. It is transmitted only by the repeater. The group ID is 253.

CWID Word

The CWID word is a Normal Call word that is recognized by the CWID word group ID. This is used when a repeater transmits the system CW identification. The group ID is 254.

Idle Word

The Idle word is a Normal Call word that is recognized by the Idle word group ID. This is used to send a word containing "Free" channel information when the repeater is idle and approximately 5 seconds since the last traffic. The group ID is 255.

Special Function Words

Figure 6C:
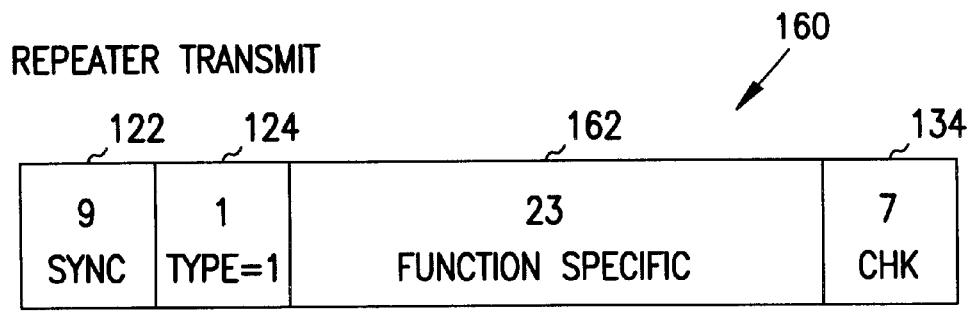
Figure 6D:
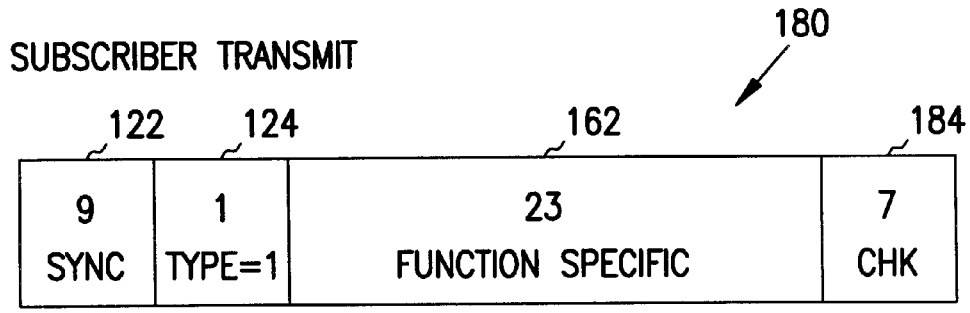

In one embodiment, special function words are identified by the TYPE bit being opposite the programmed AREA bit value. For example, a special function word has TYPE=1 when the LTR AREA=0 or TYPE=0 when the LTR AREA=1. In FIGS. 6C and 6D one example of a special function word format is provided. As before, in this example, the LTR AREA bit designation for the given locality is Boolean zero (0), because the special function TYPE bit is set to Boolean one (1). In one embodiment, the SYNC codes are unscrambled and provide the synchronization and timing advantages of SYNC codes in standard LTR systems. In alternate embodiments, the SYNC code may be scrambled. However, when scrambling the SYNC code outbound from the repeater to the subscriber units, the standard LTR subscriber units are programmed to receive standard LTR SYNC and are not programmed to correctly receive scrambled SYNC. If a different SYNC code is used for commands, the standard LTR subscriber units have an extremely difficult time in maintaining synchronization with the repeater and cannot decode words properly. Therefore, standard LTR subscriber units become "lost" and do not know what free channels to use for communications.

In the embodiments shown in FIG. 6C and 6D, the format of words 160 and 180 varies, because in word 160 a repeater transmits a Checksum (CHK) 134, but in word 180 a subscriber transmits an Inverted Checksum (ICHK) 184 to avoid confusion between standard LTR transmissions and NP transmissions from an NP subscriber. This aspect is discussed below in the section entitled Interference Issues.

The Function Specific codes 162 provide a means for supporting special functions which are not LTR compatible. According to one embodiment of the present system, NP transmissions of special function words from a subscriber are distinguished from LTR transmissions using the TYPE bit indicating special function word and the inverse checksum (ICHK) codes. However, special function repeater transmissions received by a subscriber, according to this embodiment of the present system, are not distinguished by coding the different checksum codes. Therefore, implementation of the codes and parameters for the special functions are selected to avoid misinterpretation with standard LTR commands. In one embodiment, this is performed by ensuring that the special function codes do not fall in the range of acceptable LTR commands. For example, in standard LTR, the Home range is from 1–20, the Group ID range is from 1–250, the Free channel range is from 1–20 plus 0, and the GoTo or ChiU range is from 1–20 plus 30 and 31. For instance, a special function command word is such that its field contents that map into the standard LTR GoTo or ChiU field fall outside the legal range for standard LTR, which is 21–29. When the standard LTR decodes this word it sees that the GoTo field is not in the legal range and rejects the word. Therefore, the NP special function words do not fall within these ranges to reduce the potential for misinterpretation by an LTR radio.

In one embodiment, the special function word is broken down into 4 different sub-words; special calls, command calls, channel information, and unit collection word. The sub-words have one or more defined words within the sub-words. Some examples of special function words include, but are not limited to:

Special Calls

The special call data format has the Type field set opposite the Area bit value, typically 1. The special calls are further denoted into 3 special types; auxiliary, telco, and data by UID. The special call function data formats are dependent upon the type of special call.

Auxiliary Call

The auxiliary call according to one embodiment of the NP system uses a UID to identify the beginning of the call and who is in the call. This call is used for communication from a single subscriber unit to another or to a group. The call setup passes a token field from the repeater to the mobile unit allowing the subscriber unit to use a normal word with a Token group ID for the duration of the call. This allows the call to proceed using a normal call word, which allows free channel updates to legacy mobile units. Auxiliary calling parses DTMF digits different than telco calls.

Telephone Call

The telco call according to one embodiment of the NP system uses a UID to identify the beginning of the call and who is in the call. The call setup passes a token field from the repeater to the mobile unit allowing the subscriber unit to use a normal word with a Token group ID for the duration of the call. This allows the call to proceed using a normal call word, which allows free channel updates to legacy mobile units. Telco calling parses DTMF digits different than auxiliary calls.

Data Call by UID

The data call by UID is different than the auxiliary or telephone call in that the speaker audio is muted. The data call by UID allows the subscriber unit to transmit while receiving this call. The subscriber unit may provide some external indication that this is a data call to allow a data modem to begin operation. The data call by UID according to one embodiment of the NP system uses a UID to identify the beginning of the call and who is in the call. The call setup passes a token field from the repeater to the mobile unit allowing the subscriber unit to use a normal word with a Token group ID for the duration of the call. This allows the call to proceed using a normal call word, which allows free channel updates to standard LTR subscriber units.

Command Calls

A new call type has been added to enhance and expand the ability to command and control subscriber units. The special calls are subtyped into commands. The special call data format has the Type field set opposite the Area bit value, typically 1. The special call function data formats are dependent upon the type of special call.

Interrogate

The Interrogate Request is a command repeater word type with the proper command ID. The Interrogate Ack is a command mobile word type with the proper command ID. This is used to interrogate the system to see if a subscriber unit is active.

Kill

The Kill Setup and Kill Command are both command repeater word types with the appropriate command ID. The Kill Ack is a command mobile word type with the proper command ID. This is used to kill or terminate a subscriber unit. The subscriber unit must be reprogrammed by direct connection to a personality programmer to be restored.

Reassign Group

The reassign group setup, data, and command words are command repeater word types with the appropriate group IDs and data. The Reassign Group Ack is a command mobile word type with the proper command ID. The reassign is enhanced in that any system with a system tag number and group ID position in the subscriber unit can be reprogrammed for the encode and decode group IDs. There are 128 system tag number selections and 128 group ID selections allowed.

Reassign Select

The reassign select setup, data, and command words are repeater command word types with the appropriate command IDs and data. The Reassign Select Ack is a command mobile word type with the proper command ID. This is used to select or move a subscriber unit to a system tag number and group position setting.

Assign UID to a Subscriber Unit

The assign UID is a repeater command word type. The system has the ability to assign a UID to a subscriber unit by the unit's electronic serial number, ESN. The subscriber unit responds by sending back a ESN with UID response message. This allows full roaming mobiles to be assigned a temporary UID to use while in a given locality.

ESN with UID Response

The ESN with UID is a mobile command word type. The subscriber unit may respond to certain requests by sending a ESN with UID Response message. This consists of data words containing the ESN and the UID of the subscriber unit that is responding.

Request ESN by UID

The request ESN by UID is a repeater command word type. The system shall have the ability to request a unit by a UID to send its ESN back to the system. This can be used for authentication purposes. The subscriber unit responds by sending back a ESN with UID response message.

Request UID by ESN

The request UID by ESN is a repeater command word type. The system shall have the ability to request a unit by a ESN to send its UID back to the system. This can be used for authentication purposes. The subscriber unit responds by sending back a ESN with UID response message.

Sleep Command

The Sleep Setup and Sleep Command are both command repeater word types with the appropriate command ID. The Sleep Ack is a command mobile word type with the proper command ID. This can be used to sleep a mobile; i.e., disable it from transmitting and receiving group, telco, and auxiliary calls. This is more benign than kill. If the unit is interrogated or requested to send UID or ESN the mobile shall be restored to fill functionality.

Registration

The registration message from the subscriber unit uses the mobile command word type with the proper command ID indicating registration. The repeater and system take action by registering the mobile unit into the locality where the registration took place. The mobile sends two (2) words, one for the UID and one for the registered Home where it shall reside.

De-registration

The de-registration is a mobile command word type. This is used by a subscriber unit to de-register from the system. This is when the subscriber unit knows that it will no longer be available for service, e.g., when the unit is turned off. This allows the system to handle calls to that unit by some other means than using channel resources to find out that the subscriber unit is not active. The de-registration message from the subscriber unit uses the command mobile word type with the proper command ID indicating de-registration. The repeater and system take action by de-registering the mobile unit from the locality where the registration took place.

Alpha/Numeric Commands

These are repeater command word types and are used by the system to send alpha/numeric messages to subscriber units or to provide an alpha/numeric tag to a system tag number and group position for identification of the group.

Subscriber Unit Requests a UID

A fully roaming mobile may not have a UID that it can use when it finds a locality. When a filly roaming mobile finds a locality it shall be able to request a UID to use on the locality. The locality shall respond by assigning the unit a UID. The subscriber unit may be denied by the System sending a Not Authorized by ESN message to the unit. The subscriber unit may try up to 3 times before moving on and selecting another locality, if no response is received from the System.

Channel Update Request

The channel update request is a word sent by the subscriber unit for the system to send channel update words for a specific channel or for all the channels on the locality or site. The channel update request is indicated by a command mobile word type with the given command ID.

Unit Collection Word

The Unit Collection word is used to gather a subscriber unit to a channel by the unit's UID for the purposes of receiving special calls and command calls. The Unit Collection word is indicated by the special function type and the command type being the unit collection identifier.

Channel Information Words

The subscriber units need channel information since the ChiU (channel in use) and Free do not contain direct offset numbers. New words that provide channel information have been added. These words are identified by the proper command word type and a channel update sub-word type.

Channel Update

The Channel Update word provides the channel offsets for the given channel number identifier. The offsets are 13 bits providing $2^{13}$=8,192 channels. The channel step size is 6.25 KHz. This provides the ability to reach any or all of the channels for the UHF, 800 MHz, and 900 MHz frequency bands. This channel step size provides coverage of 51.200 MHz of frequency. There are two (2) sub-words for the channel update since the amount of information exceeds the bits available in a single word, one word for receive channel offset and one word for transmit channel offset.

Adjacent Locality Identities Update

The Adjacent Locality Identities Update word provides the locality identity, the acquisition preference level and the number in the sequence to select for the surrounding adjacent localities.

Channel Bit Map

The content of the Channel Bit Map word is a bit map of the channels for a locality. The Channel Bit Map word is recognized by the repeater command word type. The Map type indicates the type of map being transmitted. The bit maps have to be split in to two (2) words for each map since the 20 bits of a map (for 20 channels) cannot be sent in a single word. The maps are for defined channels, active channels, and channel bandwidth.

NP Datastream

According to one embodiment, and as shown in FIG. 8B, the NP datastream includes: (1) a Front Porch, (2) one or more Data Words, and (3) a Back Porch.

In one embodiment, the Front Porch consists of three (3) bits: 0 0 1. This time is used to allow the transmitter to reach full power and also helps to initialize the data restoration circuitry of the receiving units.

One embodiment of the Data Word is the word of FIG. 8A. In one embodiment, the Data Word is 40 bits long.

In one embodiment, the Back Porch is one (1) bit long to allow the data adequate time to propagate through the transmit data filter and circuitry. The Back Porch may vary on the radio model from 1 to 2 bits. The logic level of the transmission of Back Porch is inconsequential, shown as 'x' in FIG. 8B.

There are several general characteristics of the NP data stream and data word. These characteristics are the same as LTR to provide compatibility:
Bit time: 3.36 milliseconds
Bit rate: 297.62 bps Word length: 40 bits
Word time: 134.4 milliseconds
Front Porch length: 3 bits
Front Porch time: 10.08 milliseconds
Back Porch length: 1 or 2 bits
Back Porch time: 3.36 or 6.72 milliseconds
Sync code: 1 0101 1000 (158H)
System Features Some of the system features are discussed which may be incorporated in alternative embodiments:

Channel Update & Idle Channel

In one embodiment of the present system, a Channel Information word is transmitted once every 5 seconds, regardless of whether the channel is busy or idle. The channel rotates through all of the channels on the locality for the Channel Update word. Adjacent Locality Identity words are transmitted. Channel Bit Map words with the 'defined, 'active', and 'bandwidth' maps are also transmitted. This allows the system to rotate through all of the Channel Information words to provide updates to any subscriber that needs the information.

A subscriber determines if it has all the channels defined for the locality within the subscriber unit. If it does not have all the Channel Information words of 'active' channels within 15 to 20 minutes of being on a locality the subscriber requests a Channel Update. This request is a specific channel if only one channel is not known, otherwise all channels are requested. The 'active' channel bit indicates a repeater is defined and is available for use.

Before a channel is added and made available for use on a locality, the system is programmed to send out the new channel as a defined locality channel in the rotated Channel Update words. A Channel Bit Map word with the 'defined' Map type follows after the Channel Bit Map word with the 'active' Map type. This lets the subscriber units know that the units should look for all defined channels. The subscriber unit does not request updates from the 'defined' map but only from the 'active' map. This should be done for a period of at least a week before the channel is made available for use. This allows subscriber units to receive Channel Update words defining the new channel(s). This will prevent the system from being flooded with Channel Update Requests. Note that the updates may be sent before the channel is even installed since the subscriber units will not attempt to use the channel until it is marked as active.

UID Size

In one embodiment, the number of unique identification numbers, UIDs, is at least 64,000. This requires 16 bits for $2^{16}$=65,536. Several UIDs are used for special identification. There will be 65,504 user UIDs with 32 UIDs reserved or used for system functions.

Electronic Serial Number

The subscriber units have an electronic serial number, ESN. There is one and only one subscriber unit per ESN and vice versa. The ESN is a 32 bit number made up of a 7 bit manufacturer number and a 25 bit manufacturer serial number. This allows for 128 manufacturers with over 33.5 million serial numbers per manufacturer.

Channel Distribution of Subscriber Units

Figure 19:
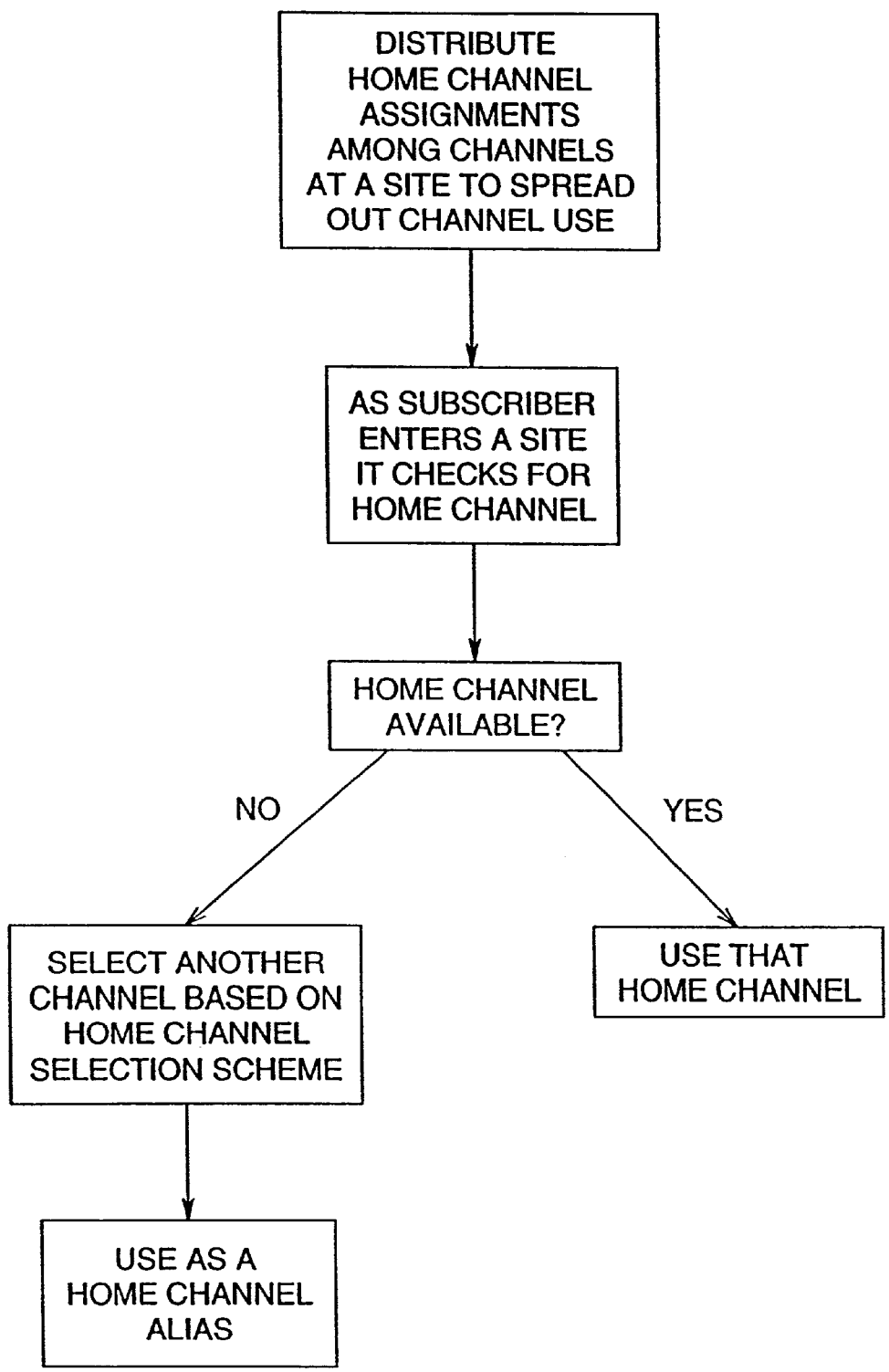
FIG. 19 is a flow diagram for a home channel assignment system according to one embodiment of the present system.

The system performance for one embodiment of NP system offers compatibility to LTR systems in that subscriber Home channel assignments are distributed over all Home channels or at least a majority of them at a locality. The channel where subscriber units reside, the number of channels that the total subscriber population is distributed over, and the backup channel capability are addressed differently. These issues impact access time, call handling, and collision probability. FIG. 19 shows a flow diagram of one embodiment of a channel distribution system.

Subscriber Unit Distribution

The total subscriber population is distributed over several 'Home' channels. If the units are spread over multiple 'Home' channels then the collision probability is reduced. This is due to the probability of different channels outputting different 'Free' channels. This requires that the subscribers strive to monitor or reside on their given 'Home' channel.

The subscriber unit and system have the ability to use an alias Home channel when the specific channel is not defined and used at a given locality. This provides uniform "Home/Group" assignment over a total system with multiple locality coverage, and eases the burden of "Home/Group" usage for a system administrator.

Roaming & Backup

In one embodiment, roaming and home channel backup are addressed by use of the 'Status' channel. The Status channel transmits on a continuous duty cycle outputting all activity on the locality. The Status channel will output the Channel Information words as explained above.

Roaming

A subscriber unit that roams is programmed for the Status channel on each locality that it can roam into. This allows the subscriber unit to scan each of the different Status channels. When the subscriber unit determines a Status channel is good, the subscriber unit will go to the Home channel for the same locality.

The second half of roaming is to know when to roam to another locality. A subscriber monitors its Home channel. If the Home channel repeater data falls below a certain usable threshold, the subscriber unit will go to the Status channel for the same locality. If the Status channel is also below a certain usable threshold, the subscriber unit will begin its scan or roaming process.

Home Channel Backup

The subscriber unit monitors or resides on its Home channel. If the Home channel repeater data falls below a certain usable threshold, the subscriber unit will go to the Status channel for the same locality. If the Status channel information is usable the subscriber unit will monitor the Status. If a 'Free' channel is given for the unit's 'Home' or a call gives a 'ChiU' as the unit's 'Home' then the unit shall return to monitor or reside on the 'Home' channel. This causes the subscriber unit to monitor the 'Home' channel the majority of the time.

Channel Usability Threshold

The channel usability threshold is dependent upon the locality coverage areas desired and the radio hardware capability. Different localities may require different thresholds to acquire and to release from a locality. This is due to the desired coverage of localities and their overlap regions. If a radio is capable of determining the RF received signal strength, RSSI, then in some embodiments, RSSI is used along with word error rates to determine usability levels. Usability levels may be different between the Home channel and a Status channel. The activity on the Home channel may have different usability determination when the channel is active with signaling words or is inactive and sending only the channel update words.

Alias Home Channel Operation

The Alias Home Channel function allows subscriber units that are programmed for a given Home channel a method to select another home channel or alias home channel for sites where the programmed home channel is not available. In one embodiment, the next lowest defined channel on a locality (set of repeaters) becomes the alias home channel and is monitored for its Home channel traffic. This allows spreading of the subscriber units across the multiple channels on a locality and not placing all the non-defined Home subscriber units on a single channel, such as the Status channel. This reduces collision probability on the system. In one embodiment, this function is accomplished by distributed Home channel numbering and by the subscriber units going to the next lowest defined channel to monitor. Distributed channel numbering is the distributed assignment of Home channel numbers so that subscribers using intervening channels are distributed among the Home channel assignments. For systems where each repeater supports a single channel the distribution of channels amounts to a distribution across actual repeaters. For example:

date the above action. Again, in the case where each repeater supports a single channel, a change in the channel is related to a change in the actual repeater used to conduct communications. This operation is shown in FIG. 20 for one embodiment of the present system.

Figure 20:
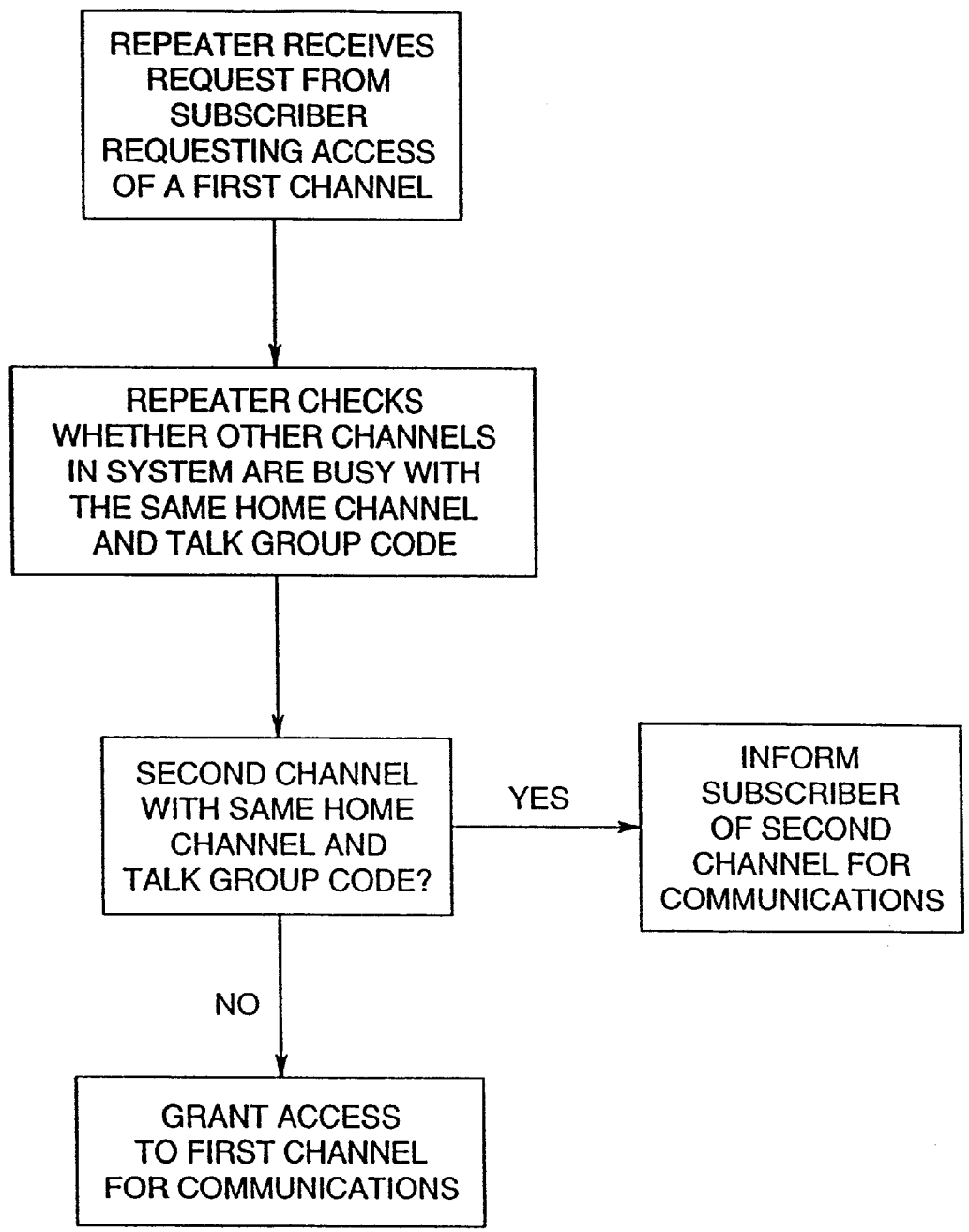
FIG. 20 is a flow diagram for a call grouping system, according to one embodiment of the present system.

As shown in FIG. 20, when a repeater receives an initial group call transmission from a subscriber unit, the repeater shall look to see if any other repeater is busy with that specific Home and Group. If there are none then the present repeater shall grant access by returning the same Home and Group with the ChiU of the present repeater. If another channel is busy with that specific home and talk group, then the subscriber is directed to that channel to conduct communications.

| 5 channel system:  | 1 |   |   |   | 5 |   |   |   | 9 |    |    | 13 |    |    |    | 17 |    |    |    |
|---|---|---|---|---|---|---|---|---|---|---|---|---|---|---|---|---|---|---|---|
| 10 channel system: | 1 |   | 3 |   | 5 |   | 7 |   | 9 |    | 11 | 13 |    | 15 |    | 17 |    | 19 |    |
| 15 channel system: | 1 | 2 | 3 |   | 5 | 6 | 7 |   | 9 | 10 | 11 | 13 | 14 | 15 |    | 17 | 18 | 19 |    |
| 20 channel system: | 1 | 2 | 3 | 4 | 5 | 6 | 7 | 8 | 9 | 10 | 11 | 12 | 13 | 14 | 15 | 16 | 17 | 18 | 19 | 20 |

The numbering of Home repeaters allows a repeater that is acting as an alias to carry an equal load of the aliased channels. In the 5 channel system repeater 1 will act as the Home for 2, 3, and 4; repeater 5 will act as the Home for 6, 7, and 8, and so on.

For example, a subscriber unit programmed for Home 12 on a 5 channel locality (numbered per the above chart) knows there is no channel 12 defined for the locality and will look for next lowest defined channel, number 9. When the subscriber unit roams into the 5 channel locality the unit will move to channel 9 to monitor for activity. In this example, repeater 9 is programmed such that if repeater 10, 11, & 12 are not active for the locality, then repeater 9 is the "alias" for repeaters 10, 11, & 12. When repeater 9 sees activity on the inter-repeater communications that another repeater is active with units from Homes 10, 11, and/or 12, repeater 9 will act like the Home for those repeaters and output the trunked traffic accordingly. Repeater 9 is reprogrammed for the proper aliasing if repeater numbering is changed.

Other aliasing techniques may be employed without departing from the scope and spirit of the invention. For example, instead of going to the next lowest available channel, the aliased home channel could be the next highest available channel.

Call Grouping

In one embodiment of the present system, the repeaters are programmed to conduct communications on a single channel for a single talk group to avoid talk group splitting. Talk group splitting occurs when two or more subscriber units of the same talk group attempt to access the system at approximately the same time on different channels. Both units may successfully handshake and, unless the repeater system assists, alternating collections will be made causing some units to go to one channel and other units to go to the other channel or, units may switch between the two channels.

A subscriber unit that is attempting to access a channel and receives a repeater response with the same Home and Group but the ChiU field is a different channel (or different repeater in cases where each repeater supports a single channel) should stop the channel acquisition and go to the channel (or repeater) of the ChiU and begin the receive process.

Figure 21:
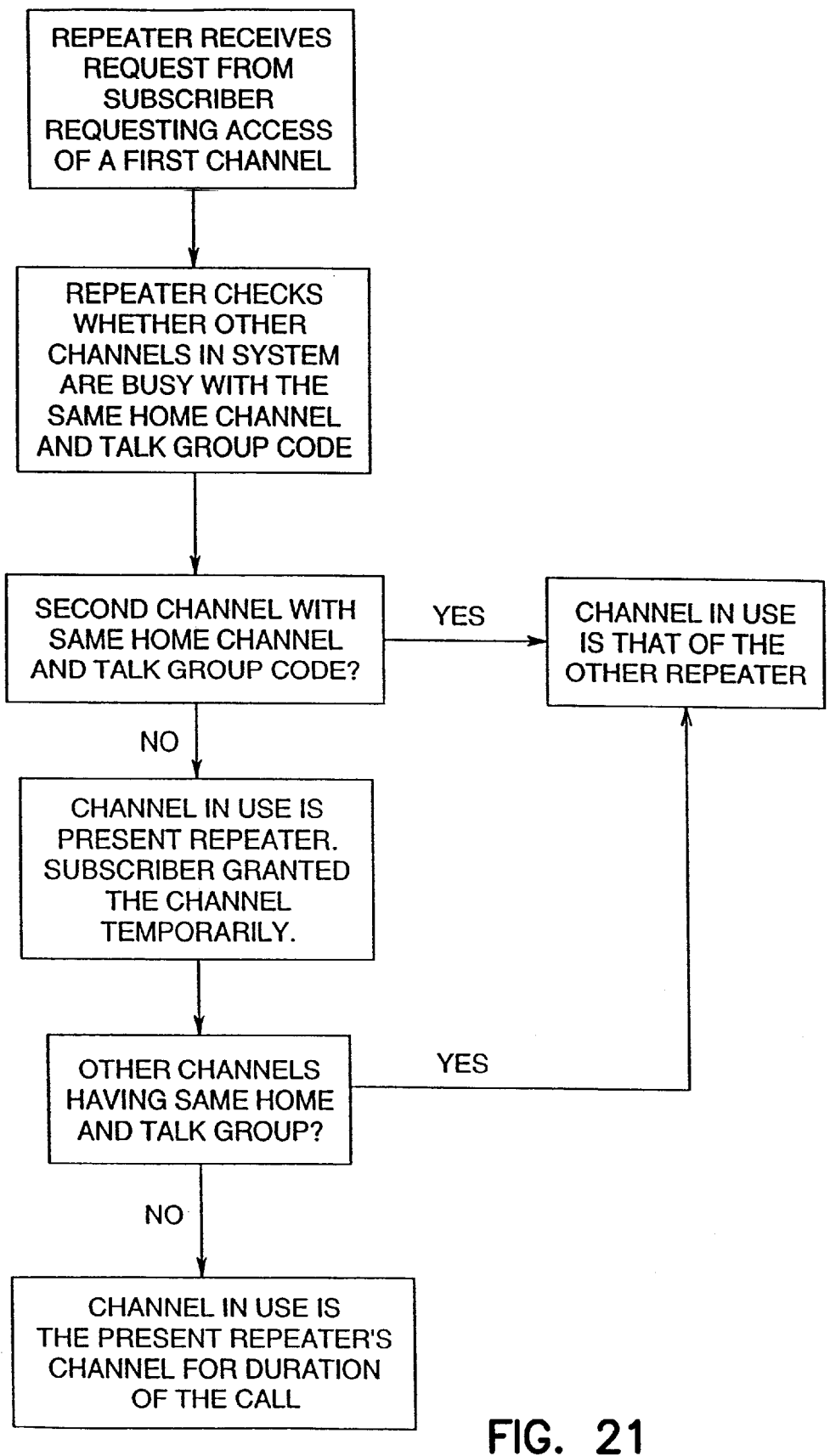
FIG. 21 is a flow diagram for a call grouping system, according to one embodiment of the present system.

Since the subscriber unit operates in the manner stated in the above paragraph the repeater must operate to accommo- FIG. 21 shows one embodiment in which a dual testing format is performed to collect subscribers to a single channel. In this embodiment, a first check of available channels is performed after the subscriber requests a channel. If a second channel is found which uses the same home and talk group, then the subscriber is directed to the second channel for communications. However, if no other channels are found to be communicating using the same home and talk group, then the present channel is granted temporarily for use. A second test is performed after the temporary grant of the present channel to determine if another channel is conducting communications using the same home and talk group information. Once the repeater grants the subscriber the channel the repeater communicates with the other repeaters. When the repeater attempts the initial inter-repeater communication, transitions from idle to busy with its local traffic at its transmission period, the repeater shall look to see if the specific Home and Group is active on another channel. If there is no other channel with the specific Home and Group active then the present repeater assumes the channel is filly granted and shall transmit the ChiU as the present repeater for the duration of the subscriber unit transmission, 10 code word drop out or Turnoff code.

Otherwise, if there was another channel active with the specific Home and Group at the initial inter-repeater communication then the present repeater shall change the ChiU that is being transmitted to the other active channel/repeater. The present repeater will operate as if the specific Home and Group is trunked traffic for the duration of the transmission from the subscriber unit, 10 code word drop out or Turnoff code. The second test accounts for the asynchronous nature of channel requests in a trunked radio system.

System Operation

Home channel distribution and aliasing and call grouping may be performed by any protocol which communicates home channel, talk group, channel in use and free channel information. For example, in LTR systems, which are explained in U.S. Pat. No. 5,159,701, and the other documents incorporated by reference above, home channel information is provided by the LTR HOME code; channel in use information is provided by the LTR GO TO code; free channel information is provided using the LTR FREE code; and talk group information is provided using the LTR ID code.

In LTRNET(tm) systems, which relate to the NP system discussed in the patent applications incorporated by reference, above, home channel information is provided by the NP HOME code; channel in use information is provided by the NP ChiU code; free channel information is provided using the NP FREE code; and talk group information is provided using the NP GROUP code.

In MULTINET(tm) systems, which are also discussed in the incorporated documents: home channel information is provided by the MULTINET(tm) HOME code; channel in use information is provided by the MULTINET(tm) GO TO code; free channel information is provided using the MULTINET(tm) FREE code; and talk group information is provided using the MULTINET(tm) GROUP code.

Those skilled in the art will readily recognize that other protocols may be used without departing from the scope of the present invention.

Home channel distribution and aliasing and call grouping may be used separately or in combination by a trunked repeater system. In a system which uses home channel distribution and aliasing and call grouping in combination, the repeaters are programmed to track and monitor the aliased home channels to perform call grouping. Additional information may be found in U.S. patent application Ser. No. 09/058,687, entitled TRUNKED RADIO REPEATER COMMUNICATION SYSTEM INCLUDING HOME CHANNEL ALIASING AND CALL GROUPING, filed Apr. 10, 1998, which was incorporated by reference in its entirety, above.

NP Word Interpretation

LTR compatibility is ensured by the NP system, since the operation of each code in the normal and special function words provide codes which may be received or ignored by an LTR radio without instructing the LTR radio to perform an unwanted function. A number of possible communication permutations are considered.

Case 1: Repeater Uses NP Protocol, Subscriber Uses LTR Protocol

When an NP repeater transmits a normal word, the TYPE bit of the normal word will be of the same Boolean value as the LTR AREA designation of the locality. The normal word will be understood by an LTR subscriber designated with the same Boolean value for its LTR AREA bit (i.e., the subscriber is "native" to the locality of the repeater) and will be ignored by an LTR subscriber having a different Boolean value for its LTR AREA bit (i.e., a subscriber associated with a different locality as the repeater—a "foreign" subscriber).

When the NP repeater transmits a special function word, the TYPE bit of the special function word will be of a different Boolean value as the LTR AREA designation of the locality. LTR subscribers native to the locality will ignore the special function word. Subscribers which are not native to the locality (foreign subscribers) will have their LTR Area bit the same as the Type bit set for special function words. The LTR subscriber units will try to interpret the word. The field contents of NP special function words have been mapped such that when they are decoded by a standard LTR subscriber unit, as in this case, the associated range for the LTR field is not a legal value and the standard LTR subscriber unit rejects the word.

When an LTR subscriber transmits an LTR protocol word, the LTR word will contain an AREA bit as designated to the subscriber. For example, if the LTR subscriber is native to the locality, the AREA bit will match the TYPE bit used by the NP repeater during transmission of normal words, and the NP repeater will automatically recognize the LTR word.

If the LTR subscriber is foreign to the locality, the AREA bit will match the TYPE bit used by the NP repeater during transmission of special function words, however, the NP repeater knows that such transmission is not a valid NP special function transmission because the checksum transmitted by the LTR subscriber is not inverted. The word will be rejected due to the improper type of checksum.

Case 2: Repeater Uses LTR Protocol, Subscriber Uses NP Protocol

The LTR repeater can transmit only an LTR protocol word. The LTR word will be recognized as a normal group ID call word if the AREA bit being transmitted by the repeater matches the AREA bit designation to an NP subscriber. Therefore, the LTR repeater can transmit only standard LTR words which will be interpreted by the NP subscriber as having a TYPE bit indicating normal words. If the NP subscriber transmits a normal word which is also a group ID call word, it will be interpreted by the LTR repeater properly. If the NP subscriber transmits a special function word, it will be rejected by the LTR repeater since the TYPE bit transmitted by the NP subscriber for a special function is opposite the AREA bit value required by the LTR repeater. Also, the checksum value transmitted by the NP subscriber for a special function call will not be the proper normal group ID call checksum value, it will be the ICHK value and the LTR repeater will reject the word.

However, if the AREA bit being transmitted by the LTR repeater is the opposite of the AREA bit assigned to the NP subscriber, therefore, the TYPE bit indicates a special function, then the NP subscriber unit will try to interpret the normal group ID call words from the LTR repeater as a special function. The majority of the command functions have field values such that the GO-TO value (which is interpreted as a ChiU value by the NP subscriber) transmitted by the LTR repeater is not in the proper range for the initiating commands and the NP subscriber will reject the word as improper due to being out of sequence. If the NP subscriber transmits a normal group ID call word, it will not have the proper AREA bit value, since the TYPE bit value is opposite, and the LTR repeater will reject the word. If the NP subscriber transmits a command call having a TYPE bit equal the repeater AREA bit value, the LTR repeater will reject the word since the command checksum value from the NP subscriber is not the proper standard checksum but the ICHK value. Therefore, special function words are always interpreted by an LTR repeater as defective and erroneous words.

Repeater and Subscriber Word Interpretation

Figure 15:
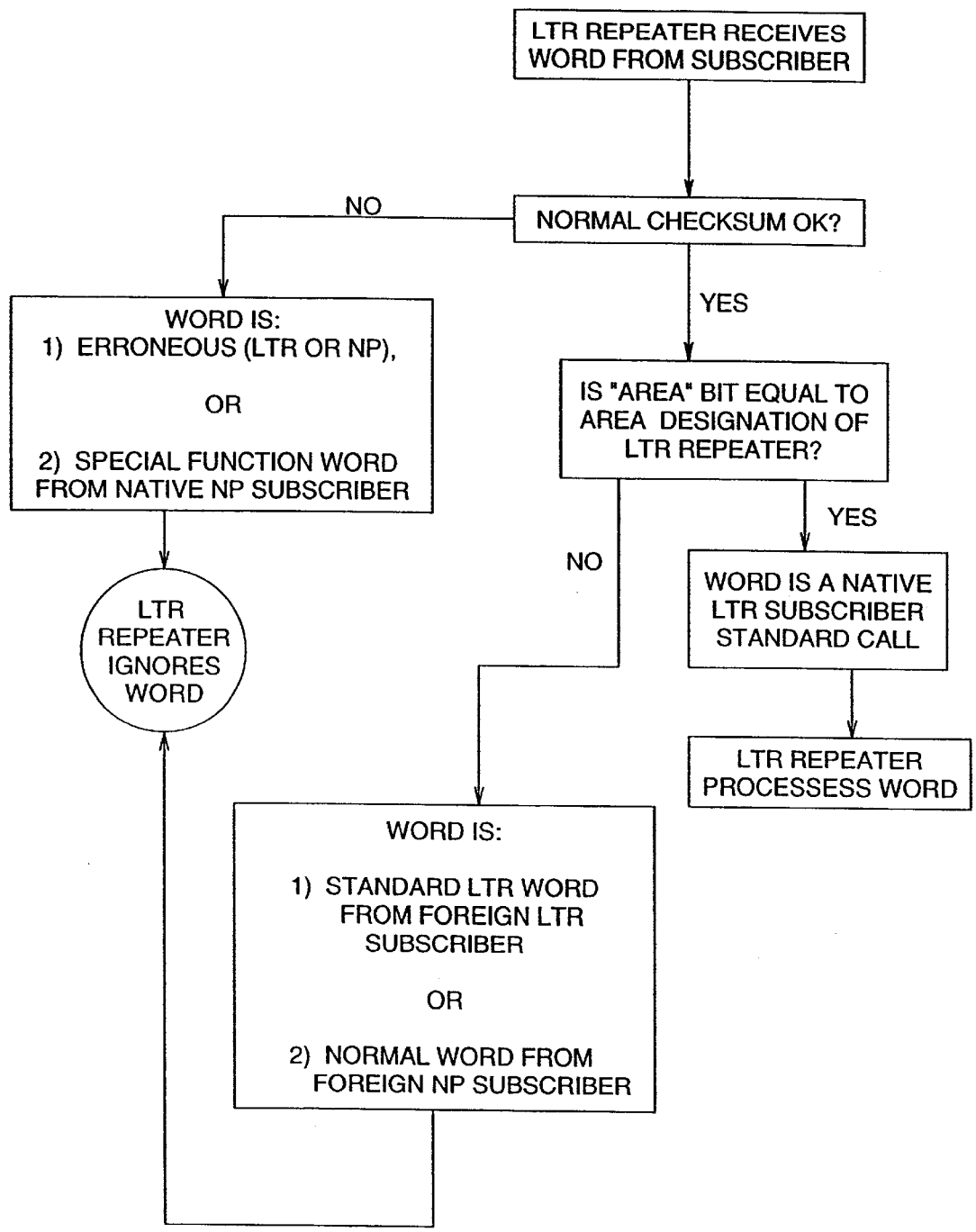
FIG. 15 is a flow diagram showing interpretation by a Logic Trunked Radio (LTR) repeater of LTR transmissions and transmissions according to one embodiment of the present protocol.

FIG. 15 is a flow diagram showing the interpretation of words received by an LTR repeater from a subscriber. The figure shows the LTR repeater interpretation for words from both an LTR subscriber and an NP subscriber. As shown in FIG. 15, the LTR repeater ignores words not having a normal checksum. Words not having a normal checksum include any erroneous words (NP and LTR) and special function NP words having an inverted checksum (transmitted by an NP subscriber). If the normal checksum is correct and the bit interpreted as an "AREA" bit by the LTR repeater is equal to the AREA designator of the repeater, then the word is processed as a standard LTR word from a native subscriber. If the received "AREA" bit differs from the LTR repeater AREA designator, then the word is ignored, as it is either a standard LTR word from a foreign LTR subscriber or it is a normal word from a foreign NP subscriber. In either case, the transmission is from a foreign radio which has not assumed the "personality" or AREA/TYPE bit designation of the locality, so the transmissions are ignored. In one embodiment of the NP protocol, subscribers entering a locality change their TYPE bit to match the AREA bit designation of the locality. Therefore, transmissions which are clearly of a subscriber using a different AREA bit designation are ignored by the foreign locality until such time as the subscriber switches its TYPE bit to match the coding of the locality.

Figure 16:
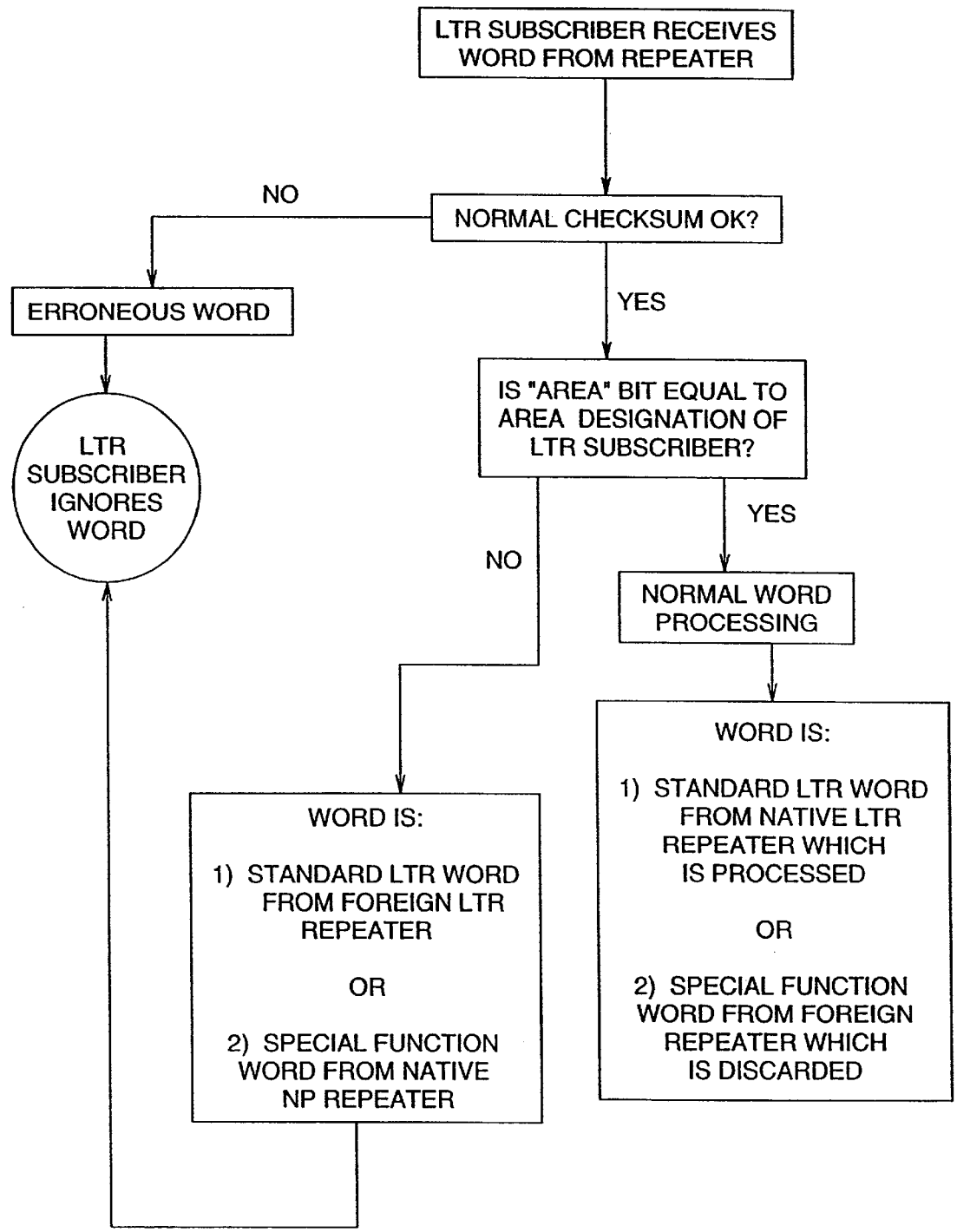
FIG. 16 is a flow diagram showing interpretation by a Logic Trunked Radio (LTR) subscriber of LTR transmissions and transmissions according to one embodiment of the present protocol.

FIG. 16 is a flow diagram showing the interpretation of words received by an LTR subscriber from a repeater. The figure shows that the LTR subscriber ignores words not having a normal checksum. Such words are either erroneous LTR or erroneous NP words. If the normal checksum is correct and the bit interpreted as an "AREA" bit by the LTR subscriber is equal to the AREA designator of the LTR subscriber, then the word received is either a standard LTR word from a native LTR repeater or a special function word from a foreign repeater. In the former case, the standard LTR word is processed according to normal LTR protocol. In the latter case, the special function word is ignored by the LTR subscriber since the field contents of the NP special function words have been mapped such that when they are decoded by a standard LTR subscriber unit the associated range for the LTR field is not a legal value. If the "AREA" bit is not equal to the AREA designator of the LTR subscriber, then the word is discarded as a standard LTR word from a foreign LTR repeater or a special function word from a native NP repeater.

Figure 17:
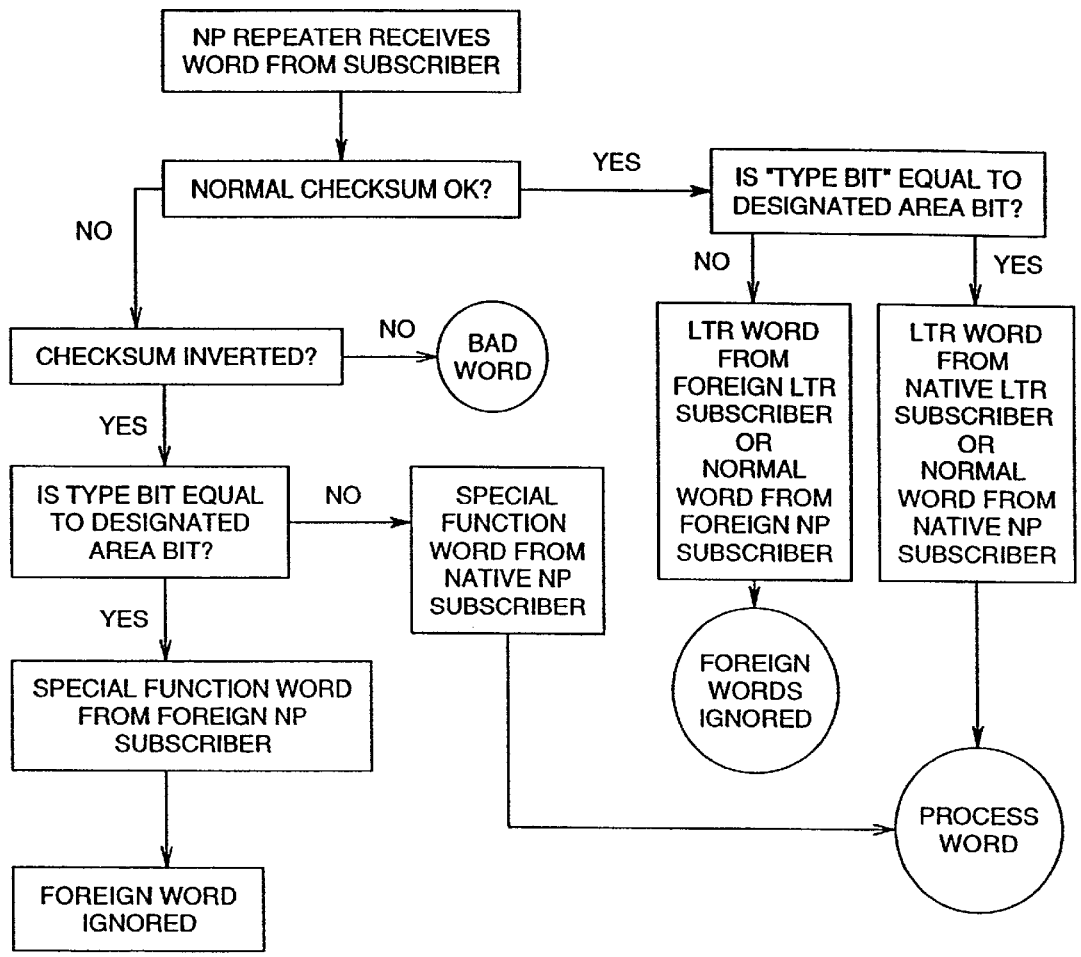
FIG. 17 is a flow diagram showing interpretation by a repeater according to one embodiment of the present system of LTR transmissions and transmissions according to one embodiment of the present protocol.

FIG. 17 is a flow diagram showing the interpretation of words received by an NP repeater from a subscriber according to one embodiment of the present system. The figure shows the NP repeater interpretation for words from both an LTR subscriber and an NP subscriber, according to one embodiment of the present system. If a normal checksum test is performed and the checksum is in error, then an inverted checksum test is performed. If the inverted checksum is also in error, then the word is ignored by the NP repeater as a bad or erroneous word. If the inverted checksum test is passed, then the word is a special function word from a foreign NP subscriber if the bit interpreted as the TYPE bit matches the AREA bit designation to the NP repeater. The word is then ignored by the NP repeater as coming from a foreign source. If the TYPE bit does not match the AREA bit designation to the NP repeater, then the word is a special function word from a native NP subscriber and the word is processed as provided by the NP protocol in use.

If the normal checksum test passes, and if the bit interpreted as the TYPE bit does not equal the AREA bit designation to the NP repeater, then the word is either a standard LTR word from a foreign LTR subscriber or a normal word from a foreign NP subscriber. Either way, the word is rejected as originating from a foreign source.

If the normal checksum test passes and if the bit interpreted as the TYPE bit matches the AREA bit designation to the NP repeater, then the word is either a standard LTR word from a native LTR subscriber or a normal word from a native NP subscriber. Either way, the word may be processed as a normal word according to the NP protocol in use.

The figure is presented to demonstrate one embodiment, and is not intended to be an exclusive, exhaustive or limiting depiction of this aspect of the present system. Procedures may be performed in different orders without departing from this aspect of the present system. For example, the steps of checking the normal and inverted checksums may be performed in different order without departing from the present system. As another example, the steps of performing the checksum and testing the TYPE bit may be performed in different order without departing from the teachings herein. Other variations are possible without departing from the teachings herein.

Figure 18:
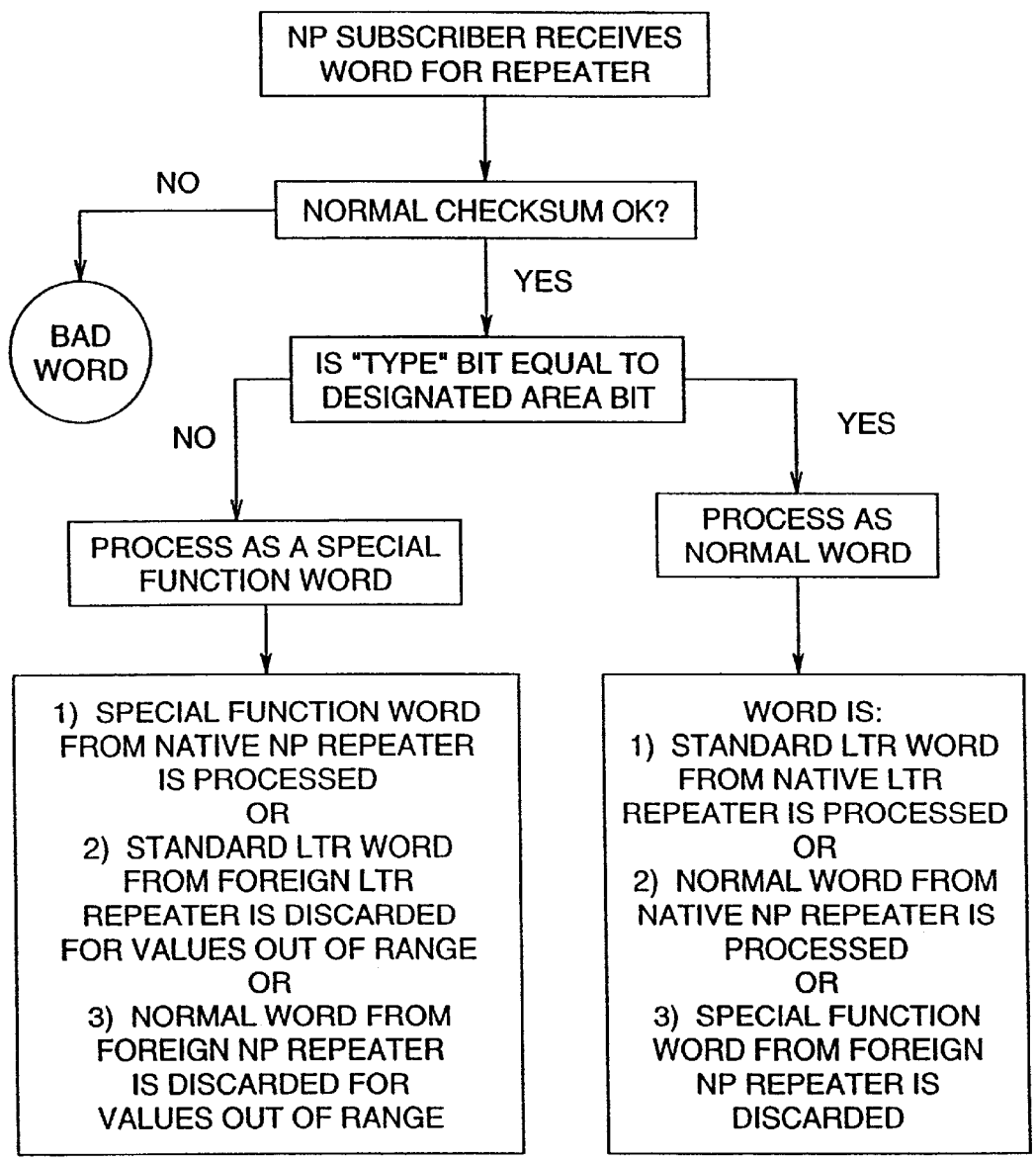
FIG. 18 is a flow diagram showing interpretation by a subscriber according to one embodiment of the present system of LTR transmissions and transmissions according to one embodiment of the present protocol.

FIG. 18 is a flow diagram showing the interpretation of words received by an NP subscriber from a repeater, according to one embodiment of the present system. The figure shows the NP subscriber interpretation for words from both an LTR repeater and an NP repeater, according to one embodiment of the present system. If a normal checksum test is performed and the checksum is in error, then the word is either an erroneous NP word or LTR word, and is ignored by the NP subscriber.

If the checksum test passes and the bit interpreted as a TYPE bit does not equal the AREA bit designation of the NP subscriber, then the received word is processed as a special function word provided by the NP protocol in use. In this case, the word may be a special function word from a native NP repeater, which is processed according to the special function word type, or the word may be a standard LTR word from a foreign LTR repeater or a normal word from a foreign NP repeater, both of which are discarded as foreign to the locality because their codes are out of range.

If the checksum test passes and the bit interpreted as a TYPE bit matches the AREA bit designation of the NP subscriber, then the received word is processed as a normal call word provided by the NP protocol in use. In this case, the word may be a standard LTR word from a native LTR repeater or a normal word from a native NP repeater, both of which are processed as normal words, or the word may be a special function word from a foreign NP repeater which is discarded for having field values out of range.

The figure is presented to demonstrate one embodiment, and is not intended to be an exclusive, exhaustive or limiting depiction of this aspect of the present system. Procedures may be performed in different orders without departing from this aspect of the present system. For example, the steps of performing the normal checksum and testing the TYPE bit may be performed in different order without departing from the teachings herein. Other variations are possible without departing from the teachings herein.

Interference Solutions

Figure 13:
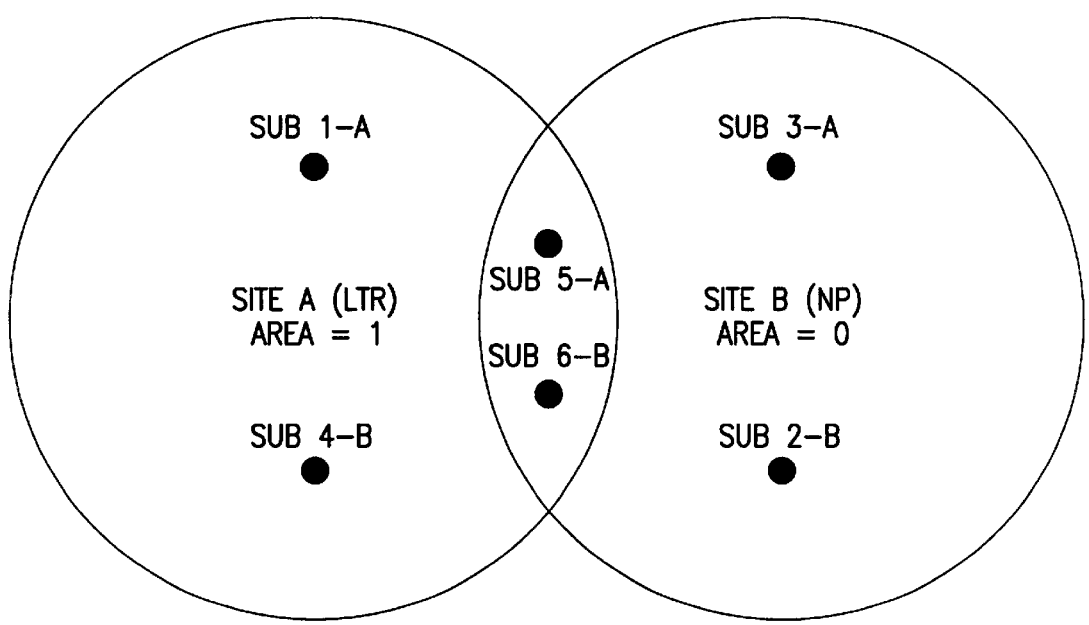
FIG. 13 is a diagram demonstrating various potential interference issues which are addressed by embodiments of the present invention.

FIG. 13 shows a number of subscribers and multiple repeaters to demonstrate how one embodiment of the present protocol prevents communication interference between LTR radios and NP radios. If not performed properly, the use of a TYPE bit in the location of an LTR AREA bit for word identification may cause interference issues for communications between adjacent sites. The particular interference problems depend on whether a subscriber is associated with Site A or with Site B and if the subscriber is being received by Site A or Site B. For example, in the following discussion, assume Site A is using standard LTR with the AREA bit set to 1, and assume Site B is NP with the normal designated AREA bit set to 0. In one embodiment, an AREA bit designation may be programmable at a repeater to set the AREA bit designation for a repeater or locality. Subscribers 1, 3, and 5 are LTR mobiles which are associated with Site A and respond to AREA bit=1. Subscribers 2, 4, and 6 are NP subscribers associated with Site B. For the NP subscribers, normal calls are TYPE (AREA for LTR) bit=0 and special function are TYPE (AREA for LTR) bit=1.

Subscriber 1 operates normally within Site A. There is no interference issue since Subscriber 1 does not hear Site B and is not received by Site B.

Subscriber 3 is totally within the Site B coverage area. Subscriber 3 will not receive or transmit to Site A and will not use or respond to normal words from Site B. Subscriber 3 uses AREA bit=1 and Site B normal word uses AREA (TYPE) bit=0.

The site-to-subscriber interference occurs when Site B sends out command words with the TYPE (AREA) bit=1.

Subscriber 3 misinterprets such words as a normal LTR word with AREA=1 and responds accordingly. The misinterpretation may result in several undesirable errors. For example, Subscriber 3 may accept an erroneous FREE channel number, or possibly change channels and open audio for 1.5 seconds, or use erroneous FREE channel and interfere with that channel. In the latter case, true interference would result due to the erroneous transmissions of Subscriber 3 due to the misinterpretation. The present protocol resolves these misinterpretation issues by ignoring transmissions from Subscriber 3, because Subscriber 3 is transmitting standard LTR words with AREA=1, but with a normal checksum (CHK), instead of the inverted checksum (ICHK) of word 180 (FIG. 6D). It is understood by those skilled in the art that other coding systems may be used to prevent interference. For example, instead of using an inverted checksum, an inverted SYNC synchronization code may be employed to prevent interference. In other embodiments, the SYNC and/or CHK bits are scrambled or otherwise encoded. Additional coding systems may be employed without departing from this aspect of the present system.

Subscriber 5 is within the coverage of both Site A and Site B, and may receive words from Site A and then Site B as it moves around in the area and has blockage from the sites. The interference issues for Subscriber 5 are resolved using the coding processes taught.

Of course, Subscriber 2 will operate normally within Site B. There is no interference issue since Subscriber 2 does not hear Site A and is not received by Site A.

Subscriber 4 is totally within the Site A coverage area and will not receive or be received by Site B. Subscriber 4 uses AREA bit=0 and Site A normal LTR words use AREA bit=1. The site-to-subscriber interference occurs when Site A is sending normal words with the AREA bit=1, these would possibly look like special function words to Subscriber 4. In one embodiment, the interference issues are avoided by carefully limiting the codes available for use by Subscriber 4. In this embodiment, codes which are equivalent to the Site A normal words (having AREA=1) are ignored by Subscriber 4, because the codes are either not of a legal value or are deemed out of sequence if the codes are of legal value.

The subscriber-to-site interference occurs when Subscriber 4 transmits a special function word having an AREA bit=1. The standard LTR repeaters on Site A will reject the special function words from the NP subscriber since the checksum value is the proper standard LTR value but the NP ICHK inverted value. When the NP subscriber transmits a normal group ID call word with the TYPE=0 it is not a match for the repeater's AREA=1 and the word will be rejected. Therefore, there is no subscriber-to-site interference from a NP subscriber to an opposite AREA standard LTR system.

Subscriber 6 is within the coverage of both Site A and Site B, and may see words from Site A and then Site B as it moves around in the area and has blockage from the sites. Resolution of the interference issues for Subscriber 6 follows from the teachings provided for Subscriber 4.

Subscriber-to-Site Interference Resolution

In one embodiment, subscriber-to-site interference issues are resolved by the NP subscriber sending command words with scrambled SYNC or checksum bits. Scrambled SYNC or checksum bits depart from those used in standard LTR. Standard LTR repeaters ignore such words, and misinterpret them as erroneous transmissions. In the embodiment where a scrambled SYNC is used, and if the checksum was not correct, then the NP repeater would not affirmatively identify the embedded SYNC bits.

In an embodiment where an unscrambled SYNC and an inverted checksum (ICHK) is used, the NP repeater need only identify a single type of embedded SYNC. However, in this embodiment, it is possible that a command word may contain a bit pattern identical to an embedded SYNC.

A caveat is that the new command word may contain embedded SYNC. The old standard repeater would behave in the same manner if the command word used inverted SYNC or scrambled checksum, delay from embedded SYNC in a bad word. This may cause the old standard repeater that is receiving the interfering signal to potentially false or miss a desired old standard mobile, but no different than receiving bad words in the standard LTR system of today. The potential percentage of words that would be possible interferers is on the order of $2^{24}*24/2^{31} =0.1875$ or 18.75% if purely random data. When a standard mobile tried to access the standard repeater, the capture ratio would probably occur since the standard mobile is probably closer in range to the standard repeater.

In another embodiment, special function words issued from an NP subscriber are used only for limited functions, such as to answer a repeater command or set up a call. In such an embodiment, after a call is set up, the mobile changes to transmit a normal word. Therefore, even if there was embedded SYNC within the command word, it could only be misinterpreted by an LTR repeater for fewer words. However, the LTR repeater would probably not decode a word from the embedded SYNC within the command word, since there is a very low probability that the bits received for checksum would be of correct value.

Site-to-Subscriber Interference Resolution

If the normal word SYNC and checksum are non-scrambled as transmitted by an NP repeater, then standard LTR radios will maintain synchronization with NP repeater words.

NP Site to LTR Subscriber of Opposite Area Bit

In one embodiment of the protocol, the TYPE bit of a normal word (NP) is programmed to be a boolean value which is opposite the AREA bit (LTR) of the site. An LTR subscriber that is using the AREA bit equal to the NP TYPE bit will decode the special function word as a normal standard LTR word that it may use. It will use the data in the word for the FREE channel and possibly to go to a channel and listen for a transmission, good group call data. This is minimized by sending command words in a short burst and returning to normal words for the rest of a conversation. Certain commands will not be usable by the LTR subscriber, certain data fields will contain invalid information; i.e., GOTO field being 21 through 29.

NP Site to LTR Subscriber with the Same AREA Bit Value

An LTR subscriber with the same AREA bit as the normal word from the NP repeater will react properly. The LTR subscriber will decode and use words with the AREA bit set for normal word transmissions. The LTR subscriber will reject good words with the AREA bit set opposite their normal AREA bit, rather than set as a special function word. If the NP repeater outputs a special function word the TYPE bit would be set the opposite as the desired AREA bit for the LTR subscriber and the LTR subscriber would reject the word.

LTR Site of Opposite AREA Bit Value to NP Subscriber

The NP subscriber will attempt to decode the standard LTR data words of opposite AREA bit as special function words. In one embodiment, the NP protocol is set up so that the NP subscriber will decode at least two (2) code words to perform a special function or the data field of a special function field would be invalid information from a standard LTR repeater; i.e., GOTO field being 24 and above. An NP subscriber may start to react to a standard LTR data word of opposite AREA bit but the probability of it completing a command would be almost zero (0).

Interrepeater Communications

Figure 7:
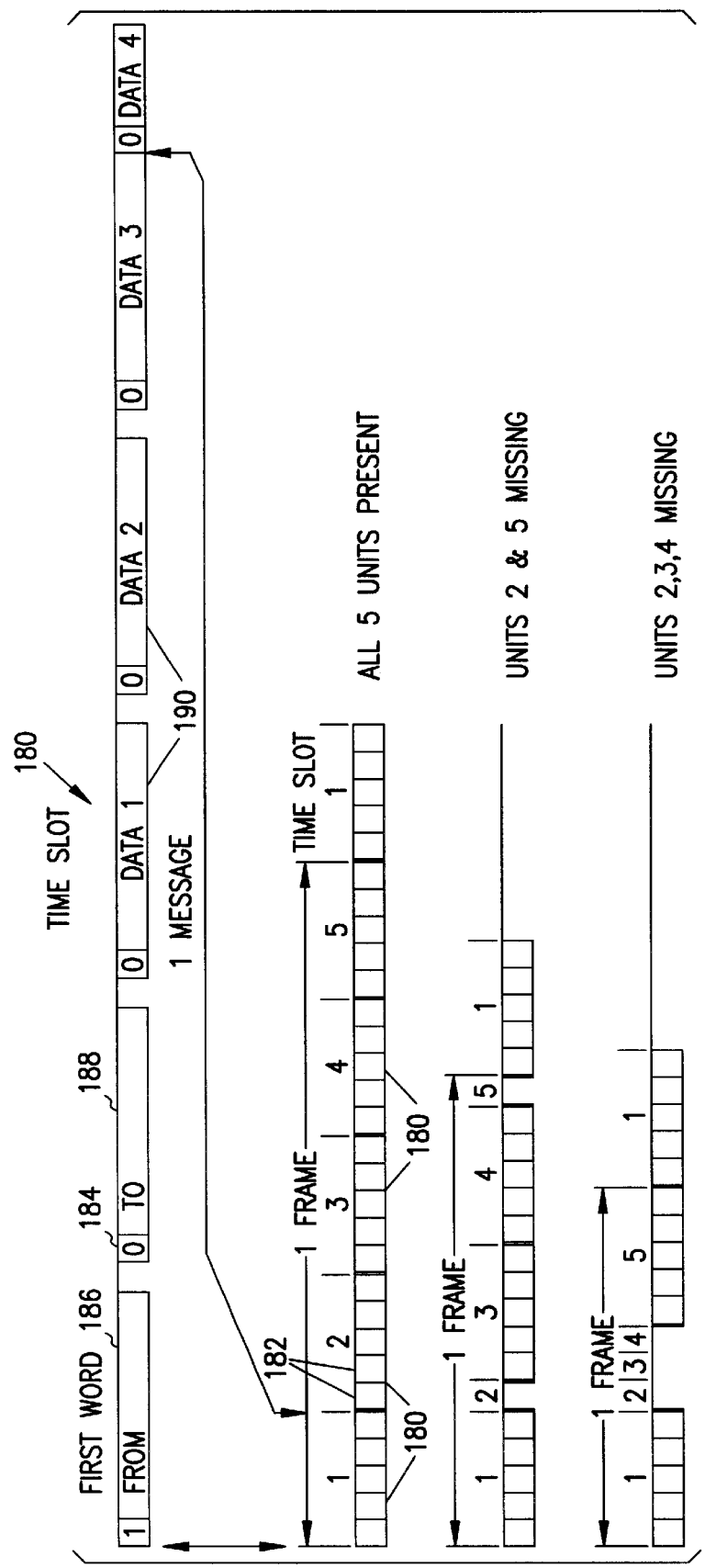
FIG. 7 is a block diagram of a high speed repeater data bus in accordance with one embodiment of the present system.

FIG. 7 shows a timing diagram for the high speed repeater data bus 42 of the repeaters 14 according to one embodiment of the present system. The switching protocol for the repeater data bus 42 provides a method for a fixed number of repeaters 14 to communicate quickly and efficiently over a common data bus with distributed control and variable time frame, while still maintaining synchronization on the bus. The switching protocol on the repeater data bus 42 is arranged into time slots or messages 180. Each message 180 is made up of a fixed number of words 182 that are in turn made up of a fixed number of bits. An entire group of messages for a particular trunked system is a frame. All of the repeaters 14 monitor the repeater data bus 42 constantly, but transmit on the repeater data bus 42 only during their respective time slot. In one embodiment, the maximum period for a time slot is the length of one message 180 (approximately 2.4 msecs), with each message 180 comprised of 6 words 182, each word consisting of a start bit, 8 data bits, a sync bit and a stop bit.

Unlike the switching protocol of the LTR (trunked) system, the switching protocol of the present system does not rely on a fixed number of messages in a frame to determine the position of the time slots in that frame. As explained below, the length of a time slot may be effectively shortened if the repeater 14 designated to transmit during that time interval is missing from the trunked system by skipping the message 180 associated with the missing repeater. The ability to skip messages 180 in the format of the frames for the signaling protocol of the present invention minimizes the time period of the frame for trunked systems having less than the maximum number of 30 repeaters. It also provides the capability for communicating control signal information among the repeaters without increasing the time period of the frame beyond the point where performance of the entire trunked system is degraded.

The first word 182 of each message 180 is uniquely identified as the first word by the sync bit 184. Sync 184 should not be confused with SYNC 122 of FIGS. 6A, 6B, 6C, and 6D. When the sync bit 184 is a "1", the word 182 is recognized by all of the repeaters 14 on the repeater data bus 42 as the beginning of a new message 180. For all other words 182 in a message 180, the sync bit 184 is set to "0". The contents of the first word 182 are FROM 186, the repeater number of the repeater transmitting this message 180. When the sync bit 184 is received by each repeater on the repeater data bus 42, the repeater updates the time slot count of the repeater number to the repeater number in FROM 186. When all of the words 182 of the message 180 have been received, the time slot count is incremented to look for the repeater number of the next repeater. Thus, if all of the repeaters in a five repeater trunked system are present, the protocol of the repeater data bus 42 would look like that shown in the first frame shown in FIG. 7. If a repeater is not present for a time slot, or if the repeater does not communicate a complete message 180, all of the other repeaters on the trunked system wait for a delay period of a little more than one word and then increment the time slot count to the next repeater. In this way, the time slots associated with missing or defective repeaters can be sequenced through much faster than the normal time period. When one or more of the repeaters are missing, the protocol of the repeater data bus 42 would look like the second or third frame shown in FIG. 7.

The second word 182 of the switching protocol is TO 188—the repeater number of the repeater to whom the following four Data Words 190 are directed. The remaining four words 182 of the switching protocol are Data Words 190 consisting of R 5, GoTo 3, Group 162, and Unique ID 166 from the switching protocol described above. The ability to transmit the same information being sent out by one repeater to another repeater in the trunked system allows the trunked system to more efficiently monitor and account for the subscriber/mobile transceiver in the trunked system.

Also, unlike the switching protocol of the LTR trunked system, the switching protocol of the present system is not dependent upon a specified repeater in the trunked system to send out the sync word of the protocol format. Because each repeater on the repeater data bus 42 is distributively responsible for establishing synchronization with the other repeaters, a repeater may be added to or removed from the trunked system without affecting the operation of the trunked system and without the need to reprogram the repeaters on the trunked system. Moreover, the trunked system is not dependent upon any single repeater to establish the synchronization for the repeater data bus 42. If one repeater was to fail, the rest of the trunked system would continue to operate and, because of the backup home channel feature, the users would notice only a possible small degradation in service because of one fewer trunked channels on the trunked system.

The signaling and switching protocols of the present system allow a variety of features and options to be implemented to establish an expanded feature set for the mobile communication system wide area network of the present system, including: variable operation, traffic logging, diagnostics, group validation, selective unit disable, dynamic reconfiguration, priority access, redundant repeater control, home channel backup, dynamic channel assignment, and automatic or manual registration.

The home channel backup feature of the present system assigns a backup channel for each subscriber 12 on the trunked system. Generally, for each trunked system, one non-home channel will be assigned as the backup channel for all of the home channels on the trunked system. In the event that a subscriber 12 does not detect any communication on its home channel for a predefined period of time (in one embodiment, approximately 1 minute), the subscriber switches to the preassigned backup channel. As the home channel repeater normally is broadcasting an update control message at least every 5 seconds, if the subscriber has not received any communications for the last six update periods it will assume that its home channel has gone off the air and will switch to the backup channel. After switching to the backup channel, if the subscriber does not detect any communication on the backup channel for a predefined time period, the subscriber will presume that it has gone out of the coverage zone of the trunked system and, if it has been programmed to do so, will attempt to automatically register on any of the other available trunked systems in the wide area network that the mobile is a user on. If, after switching to the backup channel, the subscriber does detect communication, the subscriber will use the backup channel as its home channel until such time as the backup channel transmits a control message containing the original home channel of the subscriber in the ChiU 126 field, or the FREE 132 field. This means the Status repeater is seeing the given repeater on the data bus 42 and should be available for operation. To implement a distributive approach to the home channel backup, the designated backup channel retransmits the home channel update information of all of the home channels for the trunked system at selected intervals on the backup channel. Thus, if the home channel returns to the air after a period of inactivity, it will begin transmitting update information that will periodically be repeated on the backup channel, thereby insuring that each of the subscribers for that home channel will return to their original home channel.

Dynamic reconfiguration of the subscribers in any of the trunked systems of the wide area network of the present system is accomplished by using the appropriate special function words to select and then program or move the desired unit. The information sent and received in the special function word fields will vary depending upon the particular dynamic reconfiguration function being performed.

It will be understood that the operation of dynamic reconfiguration on the trunked system requires compatible software programming in both the switch and the subscriber, along with reprogrammable memory in the subscriber for those functions that will change or reprogram initial or default values that have been stored in the subscriber. For example, a given subscriber 12 is originally programmed with a specific set of authorized groups for the trunked system it will be operating in. These groups may be stored in a table in memory (i.e., an EEPROM) in the subscriber logic unit. If the subscriber were to travel out of the coverage zone associated with the trunked system it is assigned to and into another coverage zone, the subscriber could also have stored in its memory registration channels associated with adjacent coverage zones that would allow the subscriber to contact those trunked systems. When it is determined that the subscriber has left the original zone and entered a new coverage zone, the subscriber would contact the trunked system in the new coverage zone and request automatic registration in that zone. The new switch 10 for that zone would contact the home switch 10 through the registration database 32 to verify that the subscriber was allowed to register in the new coverage zone and inform the home switch 10 that the subscriber had left its coverage zone. Once the subscriber is registered in the new coverage zone, the new switch 10 might reprogram the group that the subscriber was associated with.

Switch Functionality

The switch 10 of the present system connects several forms of communication systems together in a network system that allows communication between users of the network system and also allows a plurality of network systems to be linked together into a single wide area network. The switch 10 provides the interface to standard communication consoles (dispatch consoles 16 or control stations 18) for central dispatching and control. The switch 10, in conjunction with the dispatch consoles 16 or control stations 18, provides the mechanism to utilize the expanded feature set of the signaling protocol previously described, including Unit Interrogate, Dynamic Reassignment, and Selective Unit Disable.

Configuration of the Switch

Figure 9:
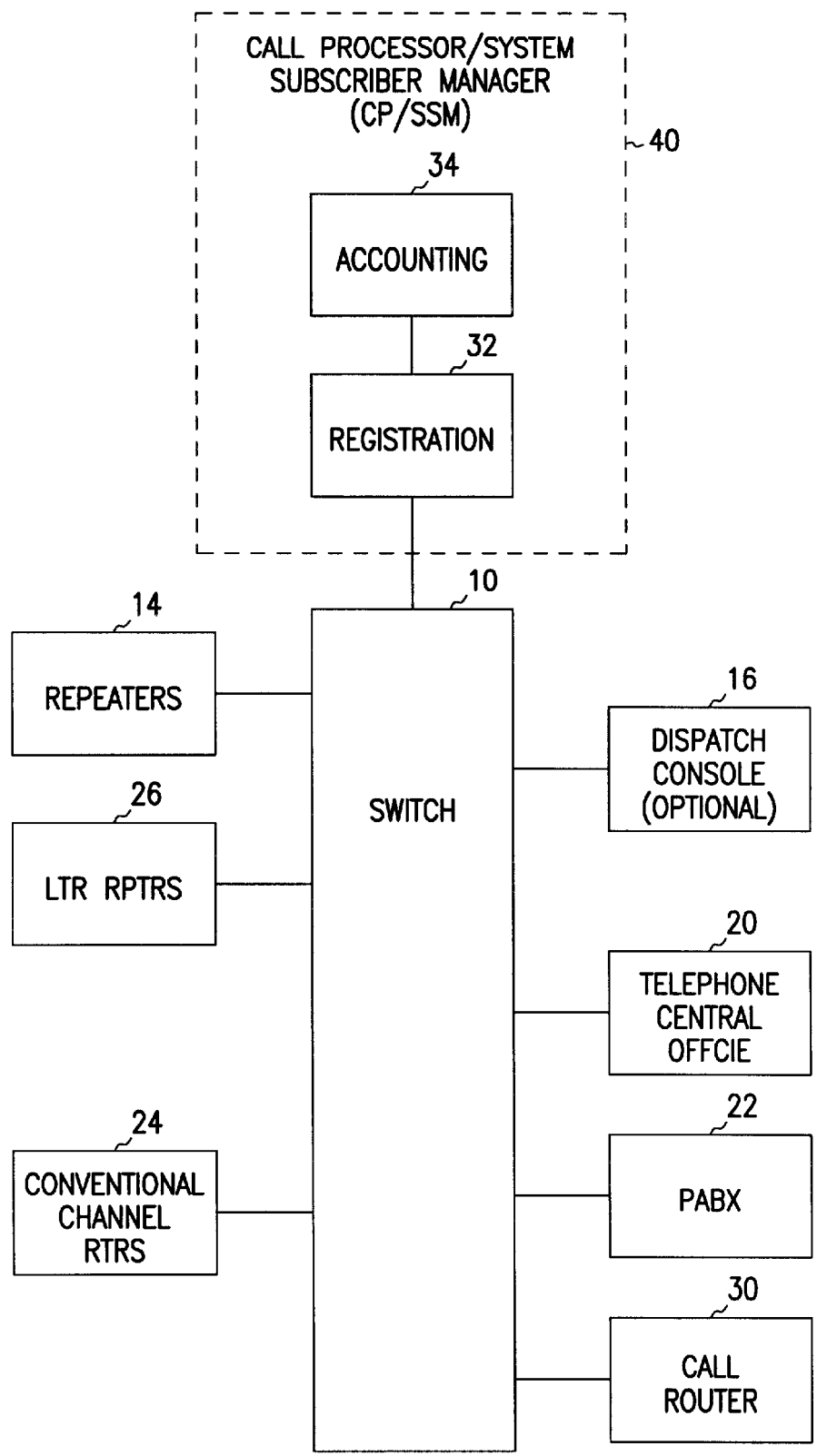
FIG. 9 is a block diagram showing various interconnections of modules for a switch, according to one embodiment of the present system.

Referring now to FIG. 9, the various forms of communication systems that are interfaced with the switch 10 are shown. In one embodiment, the switch 10 is capable of controlling up to 30 channels of radio communications. The channels can be a combination of conventional channel repeaters 24 (repeaters having no form of over-the-air control functions), LTR repeaters 26, or NP repeaters. In this embodiment, the maximum number of each of these types of repeaters is 30 for the conventional channel repeaters 24, 20 for the LTR repeaters 26, and 20 for the NP repeaters. The call router 30 allows communication with another switch 10.

Figure 12:
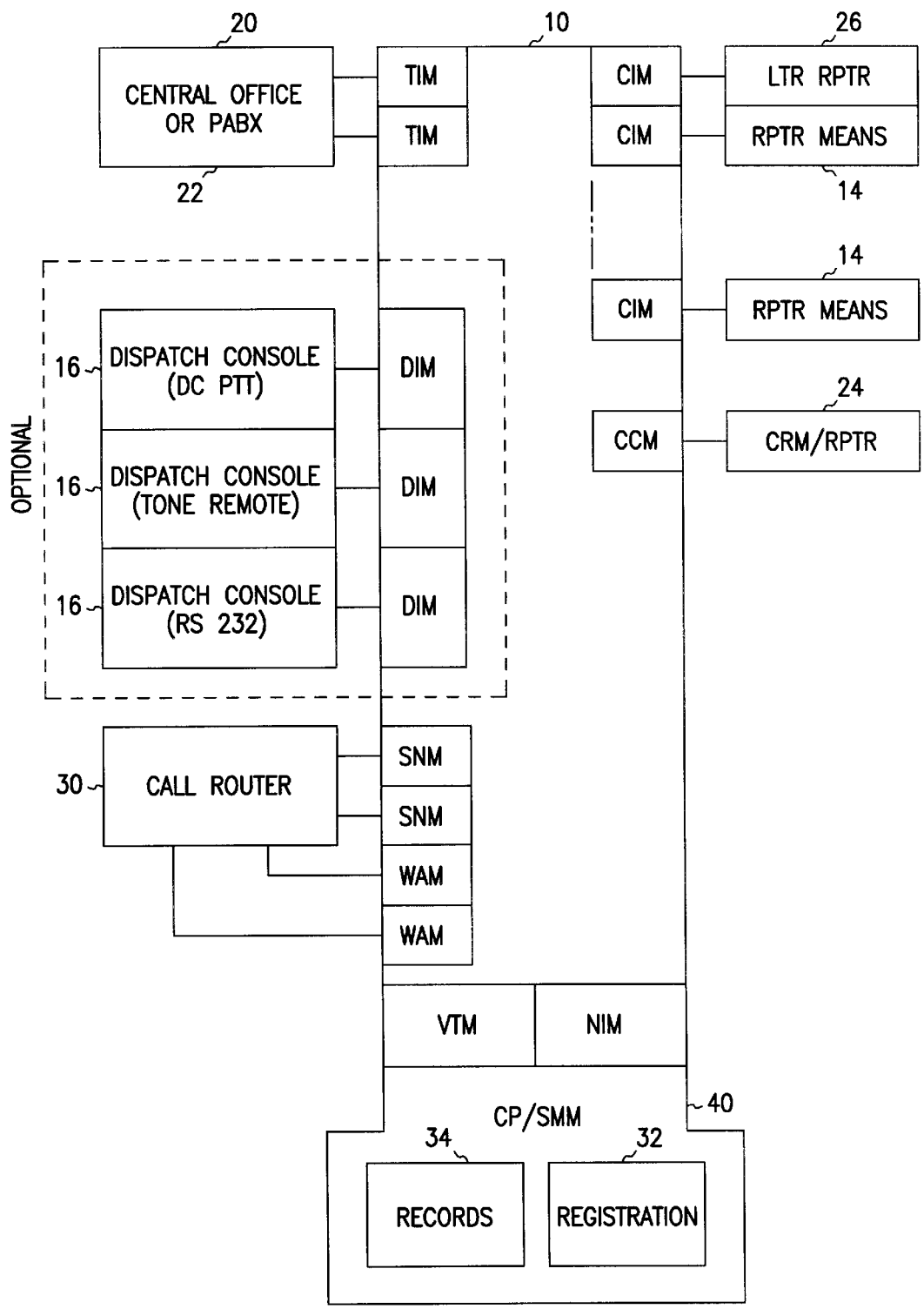
FIG. 12 is a block diagram showing various modules for a switch, according to one embodiment of the present system.

The switch 10 connects the various communication paths among these elements and gives priority access to the proper modules. System trunking during calls is preserved through the switch 10 unless fixed by full-duplex or the use of hangtime. Access time for calls to and from any one of the trunked systems is approximately 0.3 seconds, excluding signaling time for external devices such as Tone Remote detection time and the passing of DTMF information. The Switch 10 automatically routes outgoing telephone calls to the telephone central office 20 on the least cost line and produces a traffic accounting record of calls made by Group and/or Unique ID. Call Processor/System Subscriber Manager (CP/SSM) 40 may be located externally to the switch 10, as shown in FIG. 9, or located internally to switch 10 as shown in FIG. 12. CP/SSM 40 performs call handling and call transaction recording functions. The resulting records may be accessed by the record monitor 34 and includes: call time, call duration, telephone number dialed, and if a subscriber 12 terminated or originated the call. In one embodiment, these records are preserved in non-volatile disk memory.

Wide area coverage between multiple switches 10 is directed by DTMF entries from either the requesting subscriber 12 or the telephone central office 20 or the control stations 18. Wide area coverage on a group basis within a given switch 10 is performed by a crosspatch of the dispatch console 16 or by the call router 30 to the desired repeater(s) 14. Wide are coverage on either a group or individual basis outside the switch 10 is determined by the requesting subscriber 12 and is established by the call router 30.

Figure 10:
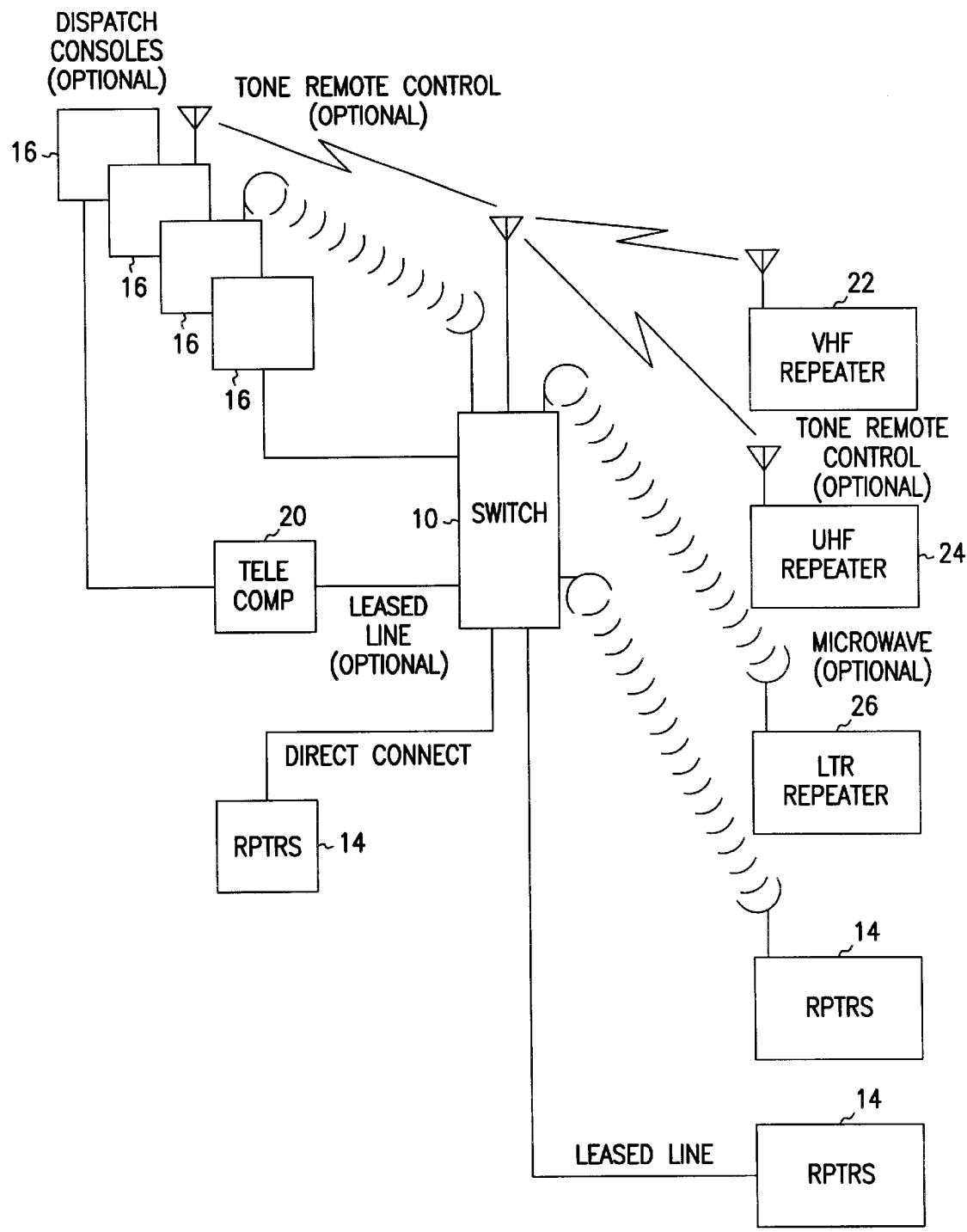
FIG. 10 is a block diagram showing various interconnections of a switch with repeaters and dispatch consoles within a coverage zone, according to one embodiment of the present system.
Figure 11:
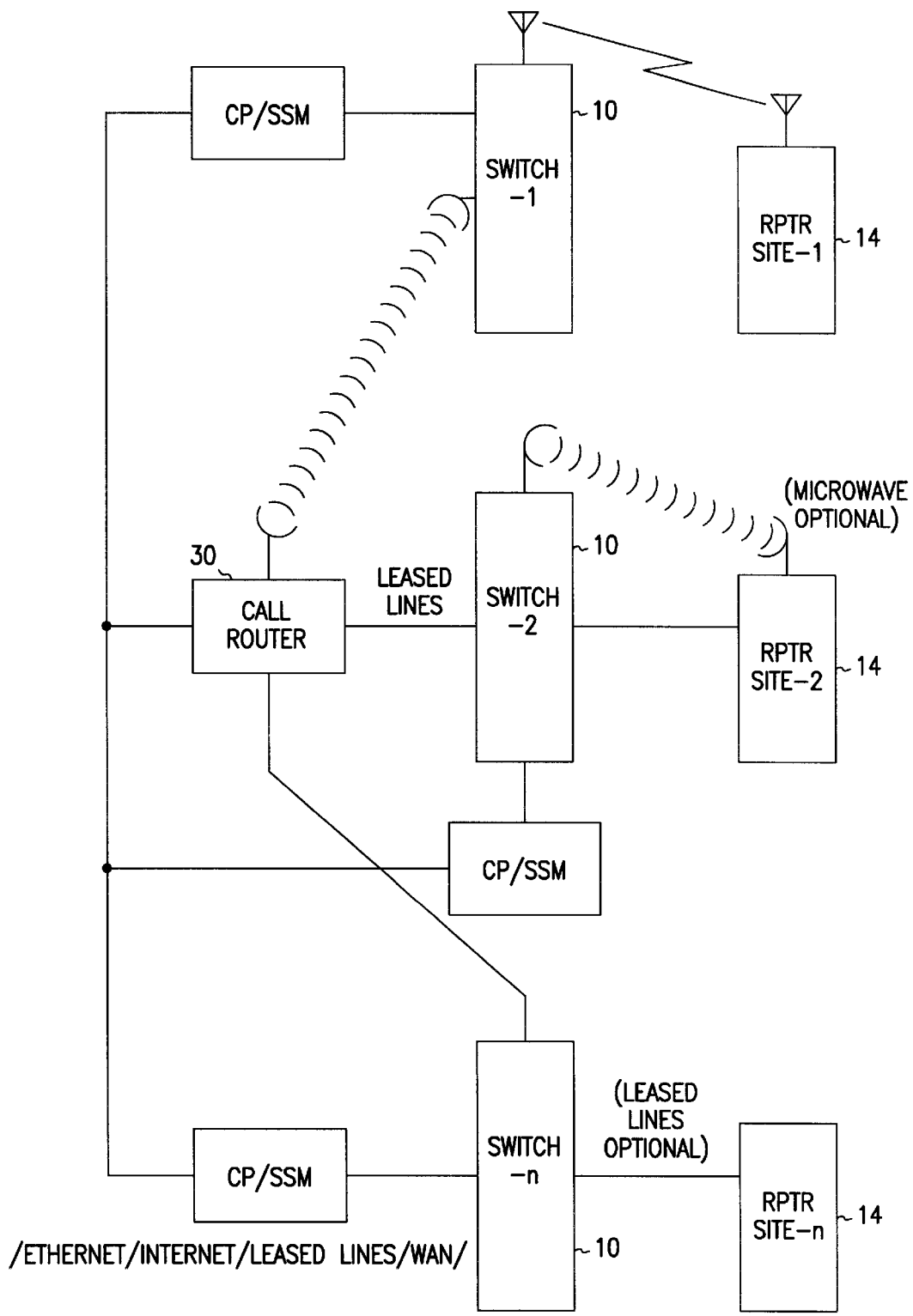
FIG. 11 is a block diagram showing various interconnections of multiple switches and multiple repeater sites providing a wide area network of multiple coverage zones, according to one embodiment of the present system.

Referring now to FIGS. 10 and 11, various methods for interconnecting the elements associated with the switch 10 are shown. In FIG. 10, the switch 10 is shown as interconnecting by RF communication with conventional channel repeaters 24 (either VHF or UHF), by microwave link with an LTR repeater 26, and by microwave, leased line, or direct connection with the repeaters 14 of the present invention. Switch 10 may be connected with the dispatch console 16 by RF communication, by microwave link, by direct connection, or by leased line through a telephone interconnect 20. In FIG. 11, the various methods of linking multiple switches 10 in a wide area network are shown. The switch 10 may be connected with the call router 30 via microwave link, leased lines or by direct connection. The registration database 32 may also be connected with the switch 10 by each of these means. Again, the switch 10 may be connected to the repeaters 14 by any variety of methods, depending upon whether the repeater(s) 14 is physically located proximate or distant to the switch 10. The lines connecting the CP/SSMs to the call router may be INTERNET connections, leased lines, including 56 KB leased lines, standard Wide Area Network (WAN), or 10 MB ETHERNET connections. Other connections may be used without departing from the present teachings.

Architecture of the Switch

One embodiment of the internal architecture of switch 10 is shown in FIG. 12. The main interfaces to the switch 10 include the Channel Interface to the various channels, the interface with Dispatch Consoles 16, the interface with the Public Switched Telephone Network 20, the interface to other switches via the call router 30, and the interface to the CP/SSM. The Switch 10 is constructed of different modules that interface from the Switch 10 to external devices.

The modules as shown in FIG. 12 and discussed in the following sections are: the Channel Interface Module (CIM), connecting the switch 10 to the either a LTR repeater or to the repeater 14 of the present invention; the Conventional Channel Module (CCM), connecting the switch 10 to a Conventional Channel; the Dispatch Interface Module (DIM), connecting the switch 10 to the Dispatch Consoles 16; the Telephone Interface Module (TIM), connecting the switch 10 to the PSTN 20 or PABX 22; the System Network Module (SNM), connecting the switch 10 to other SNM's, and, via the call router 30, to other switches 10; the Wide Area Module (WAM), connecting the switch 10 to other WAM's, and, via the call router 30, to other switches 10; the Voice Tone Module (VTM), providing voice and tone messages to the switch 10; the Network Interface Module (NIM), connecting the switch 10 to the CP/SMM.

The Call Processor/System Subscriber Manager (CP/SSM) monitors traffic and produces a usage record; determines channel usage and amount of time all channels in a site are busy in time periods of 6, 10, 15, 30 or 60 minutes; receives notification as soon as a channel or system element failure is detected; programs hangtime, initiated on an mobile channel from the switch, to hold a connection on the Trunked System; programs a Dispatch Console 16 (equipped with connection control) with the ability to participate in a call; initiate ID Validation that determines if a Group or Unique ID is allowed to use the system for voice communication or any operation, and maintain a list of which IDs are enabled or mobile units disabled for operation by the switch; performs dynamic reconfiguration of an mobile unit in the Trunked System; and performs least cost routing for outgoing telephone calls.

The CP/SSM hardware, according to one embodiment, includes a personal computer with 80586 or 80686 microprocessor with a minimum speed of 133 MHZ, 32 megabytes of RAM, a hard disk for greater than 2 gigabytes storage, at least two serial ports, a 10 megabit ETHERNET port, executing MICROSOFT NT 4.0 or better, and executing appropriate executable software, The Network Interface Module (NIM) interfaces the CP/SSM to the internal communication of the switch 10. The NIM buffers data communication via a full duplex RS-232 channel on the Intra-terminal Data Bus (IDB) to the System Management Bus (SMB). The NIM is also a buffer between the Channel Status Bus (CSB) to the System Status Bus (SSB). The NIM provides the Master Clock and Master Sync for the signaling control of the pulse code modulation (PCM) voice busses. The Master Clock and Master Sync for the PCM busses are redundant in the NIM. A detection circuit monitors the two different sets and if master clock A is off frequency, B is activated. If both A and B are off frequency, an alarm is sent to the SMM and the NIM removes both sets from distribution in the switch. The switch is allowed a Master and Slave NIM, enabled or disabled from operation on the data communication path. The master tells the slave when both its clocks are off frequency and the slave clock is distributed, if the slave clocks are on frequency.

The Channel Interface Module (CIM) connects the switch 10 to the repeater 14 and to LTR Repeaters 26. Each repeater 14 has a CIM that monitors and controls the repeater through a signaling protocol. The CIM controls a LTR repeater 14 through a Logic Module (LM). A LM is the logic drawer in the repeater that interfaces the CIM in the switch with the receiver and transmitter in the repeater. The LM is connected to the CIM by 4-wire 600 ohm balanced audio. The LM is controlled by blank and burst mode, 1200 baud, Audio Frequency Shift Keying (AFSK) data or by digital RS-232 data for both transmit and receive data. The CIM passes information to and from the LM that controls the repeater and its operation.

The Conventional Channel Module (CCM) connects the switch 10 to a conventional repeater 14. Each conventional repeater 14 has a CCM that controls the repeater through logic signaling. The CCM controls a conventional repeater through the Conventional Repeater Module (CRM). A CRM is the logic drawer in the repeater that interfaces the CCM in the switch with the transmitter and receiver in the repeater. The CRM is connected to the CCM by 4-wire 600 ohm balanced audio. The CRM is controlled by blank and burst mode, 1200 baud, Audio Frequency Shift Keying (AFSK) data for both transmit and receive data. The CRM connects to the repeater via 4-wire 600 ohm balanced or unbalanced audio. The CCM reflects the activity of the repeater and acts as a gateway for transmissions between the switch and the conventional repeater, thus allowing the conventional repeater to look like an LTR repeater or the NP repeater of the present system for a given site, home, and group.

The Dispatch Interface Module (DIM) uses one of three methods of interface the switch to the dispatch equipment, Direct Connection, Tone Remote, and Digital Data. A DIM with direct connection is associated with only one group code and uses a form of Type II E & M lead input similar to the mobile PTT. A DIM with tone remote connection decodes guard tone for the PTT indication and decodes DTMF to select from one of ten group codes. A control sequence uses the DTMF to place the DIM in scan mode or to stop and use a specific group code. The tone remote feature requires the use of an add on personality card. The most versatile DIM has a digital data connection that requires a separate full duplex 9600 baud, RS-232 channel. The separate data path is required because the intelligent dispatch console can monitor and display the information of the system. The information exchanged between the DIM and an intelligent dispatch console contains what the DIM receives and transmits. The DIM connects the 4-wire 600 ohm balanced audio with the Pulse Code Modulation (PCM) data paths and communicates to other modules via the Intra-terminal Data Bus (IDB). The DIM also monitors the Channel Interface Module (CIM) and the Channel Status Bus (CSB) to determine if a CIM is active with a DIM group. Some of the functions performed by the DIM include: unique ID display; status display; unique ID calling; emergency display; emergency answer; site select calling; interrogate—static and dynamic.

The Trunk Interface Module (TIM) connects the switch to the telephone lines and handles telephone line protocols. The TIM logic unit is microprocessor controlled and communicates to the CP/SMM via the intra-terminal data communications. A switch may have multiple TIMs with varying styles of telephone lines attached, for example, connection to Central Office, or connection to PABX system. The telephone line audio is processed to interface with the Pulse Code Modulation (PCM) voice path. The basic TIM operation functions are: Signaling, Call Supervision, and Intra-terminal Communications.

The System Network Module (SNM) is the interface that allows Unique ID calling from mobile units and multiple switches to be connected in a total wide area network. The SNM uses a 4-wire 600 ohm balanced audio on the interface and connects audio to the PCM data paths. The SNM also uses a Type II E&M lead connection set for connection initiation and supervision. The SNM communicates with other modules via the Intra-terminal Data Bus (IDB) and monitors the Channel Status Bus (CSB) for the group set up to use the SNM. The switch may be one terminal in a multiple terminal system created by connecting the switch via the SNM, through a 4-wire E&M lead interface, to a system switching node or Private Automatic Branch Exchange (PABX). The SNM can dial pulse or DTMF the desired site, another SNM interface in the same switch or in a different switch. SNM's pass information on the interface relative to the type of call desired and connection status of the end device using Audio Frequency Shift Keying (AFSK) in a blank and burst mode. This form of data passing allows a standard 4-wire interface connection and does not require a specialized system switching node.

The Voice Tone Module (VTM) provides tone and voice messages to modules that indicates call progress to the users. The VTM contains 8-fixed slots of digitized PCM audio messages stored in PROM that are 4-seconds in length and repeat continuously on the VTM PCM bus of the switch. The start of the message is indicated in the transmission so modules can present the audio message to the user from the beginning of a message. There may be up to four VTMs within a system, depending upon the messages required.

Mobile Transceiver Operation

Figure 14:
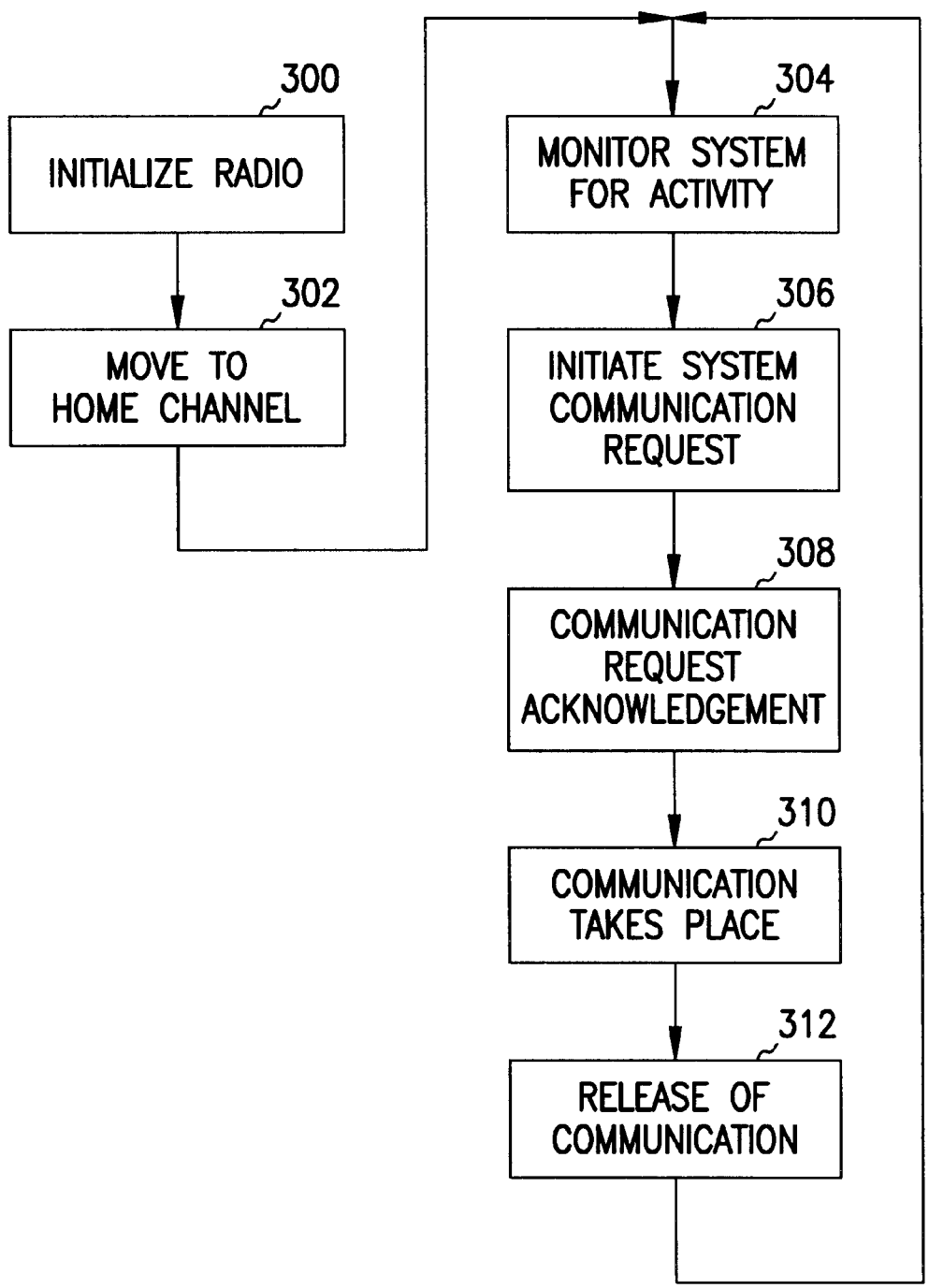
FIG. 14 is a flow diagram for communications according to one embodiment of the present system.

The operation of a subscriber 12 within the distributive wide area network transmission trunked communication system of the present system will now be discussed. FIG. 14, broadly depicts in flow diagram format, how a subscriber 12 communicates in the communications system of the present invention. The subscriber is powered up in the initialize radio step 300. Operational flow is then immediately directed to the step 302 wherein the subscriber 12 goes to its preassigned home channel. Operational flow then proceeds to step 304, where the subscriber 12 listens for incoming signals transmitted on its home channel. As described in detail above, the transceiver will be monitoring its home channel, or other temporarily assigned channel, for signaling information relating to system priority, channel availability, etc., that is broadcast by the system. Operational flow proceeds to step 306, to initiate a system transmission request, when the operator of the subscriber unit 12 desires to transmit. The request to communicate is acknowledged in step 308 through a return control signal transmitted by the assigned repeater, and operational flow proceeds to step 310 where the transmission takes place. Once the transmission has been completed the transmitter is released in step 312, and operational flow returns to step 304 where the system continues to monitor the system for activity.

Once the protocol for the normal and special function words is established, the call and response signaling between repeater and subscriber can take place in any pattern, as long as the LTR call bounce patterns are maintained by the system for normal word transmission. One skilled in the art will readily recognize that several specialized calls and responses may be implemented using the NP protocol provided herein.

The foregoing description is intended to demonstrate embodiments of the present invention. One skilled in the art will readily recognize that systems having different names, codes and procedures are taught by the present teachings and do not depart from the scope of the present invention. The teachings herein are not to be taken in an exclusive, exhaustive, or limiting sense, but are provided to describe different modes of the present invention, and the scope of the present invention is given by the attached claims and their equivalents.

What is claimed is:

1. A communications protocol for a system of one or more repeaters and one or more subscribers, comprising:
   a plurality of word formats for communications between the one or more repeaters and the one or more subscribers, each word format including:
   a synchronization code for receiver synchronization;
   a type code indicating a first word format and a second word format and compatible with protocols using an area code to identify subscribership to a particular repeater site; and
   a checksum code to error check communicated words; and
   where the first word format further includes:
   a channel in use code to identify a channel in use;
   a home code identifying a home channel;
   a group code providing a code for one or more groups of subscribers; and
   a free code identifying a free channel; and
   wherein the second word format further includes function specific codes to perform a plurality of functions.

2. The communications protocol of claim 1, where the communications protocol is compatible with Logic Trunked Radio (LTR) communications.

3. The communications protocol of claim 1, where the first word format supports Logic Trunked Radio (LTR) communications.

4. The communications protocol of claim 1, where the channel in use code is used to provide receive channels and transmit channels.

5. The communications protocol of claim 4, where the receive channels and transmit channels have programmable relative offsets.

6. The communications protocol of claim 1, where transmissions of the first word format are recognized by Logic Trunked Radio (LTR) subscribers.

7. The communications protocol of claim 1, where transmissions of the second word format provide functions not supported by Logic Trunked Radio (LTR) subscribers.

8. The communications protocol of claim 1, where the type code comprises a type bit compatible with an AREA bit of a Logic Trunked Radio (LTR) protocol.

9. The communications protocol of claim 1, where the checksum code is inverted for transmissions from a subscriber to a repeater.

10. The communications protocol of claim 1, where the type code comprises a type bit matching a Logic Trunked Radio (LTR) AREA code of a repeater site for transmissions of words according to the first word format, the type bit inverted for transmissions of the second word format.

11. The communications protocol of claim 1, where the type code comprises a type bit matching a Logic Trunked Radio (LTR) AREA code of a repeater site for transmissions of words according to the second word format, the type bit inverted for transmissions of the first word format.

12. The communications protocol of claim 1, where the type code comprises a type bit in a bit position equal to that of a Logic Trunked Radio (LTR) AREA bit.

13. The communications protocol of claim 1, where the home code, free code, and channel in use code are used in home channel aliasing.

14. The communications protocol of claim 1, where the home code, free code, group code and channel in use code are used in call grouping.

15. A radio incorporating the communications protocol of claim 1.

16. A subscriber incorporating the communications protocol of claim 1.

17. A repeater incorporating the communications protocol of claim 1.

18. A communications protocol for a system of one or more repeaters and one or more subscribers, comprising:
   a plurality of word formats for communications between the one or more repeaters and the one or more subscribers, each word format including:

a synchronization code for receiver synchronization;

a type code indicating a first word format and a second word format and compatible with a Logic Trunked Radio (LTR) protocol AREA bit, where the type code related to an LTR AREA code of a repeater site for transmissions of words according to the first word format, the type code inverted for transmissions of the second word format; and a checksum code to error check communicated words, wherein the checksum code is inverted for transmissions from a subscriber to a repeater of words of the second word format; and where the first word format further includes:

a channel in use code to identify a channel in use;

a home code identifying a home channel;

a group code providing a code for one or more groups of subscribers; and a free code identifying a free channel; and wherein the first word format supports LTR functions and the second word format supports function specific codes to perform a plurality of functions and such that the communications protocol is compatible with Logic Trunked Radio (LTR) communications.

19. A radio incorporating the communications protocol of claim 18.

20. A subscriber incorporating the communications protocol of claim 18.

21. A repeater incorporating the communications protocol of claim 18.

22. A trunked radio network, comprising:

a plurality of subscribers;

a plurality of repeaters, wherein at least one repeater uses the communications protocol of claim 1;

two or more switches interconnecting repeaters at two or more sites; and one or more call routers interconnecting the two or more switches.

23. The trunked radio network of claim 22, wherein at least one subscriber uses the communications protocol of claim 1.

24. The trunked radio network of claim 22, wherein Logic Trunked Radio (LTR) communications are supported.

25. The trunked radio network of claim 22, comprising at least one subscriber communicating using Logic Trunked Radio (LTR) transmissions.

26. The trunked radio network of claim 22, comprising one or more repeaters communicating using Logic Trunked Radio (LTR) transmissions.

27. The trunked radio network of claim 22, comprising a call processor/subscriber system manager for each switch of the two or more switches.

28. A trunked radio network, comprising:

a plurality of subscribers;

a plurality of repeaters, wherein at least one repeater uses the communications protocol of claim 18;

two or more switches interconnecting repeaters at two or more sites; and one or more call routers interconnecting the two or more switches.

29. The trunked radio network of claim 28, wherein at least one subscriber uses the communications protocol of claim 18.

30. The trunked radio network of claim 28, wherein Logic Trunked Radio (LTR) communications are supported.

31. The trunked radio network of claim 28, comprising at least one subscriber communicating using Logic Trunked Radio (LTR) transmissions.

32. The trunked radio network of claim 28, comprising one or more repeaters communicating using Logic Trunked Radio (LTR) transmissions.

33. The trunked radio network of claim 28, comprising a call processor/subscriber system manager for each switch of the two or more switches.

34. A method of communications, comprising:

transmitting words having a same number of bits as Logic Trunked Radio (LTR) words; and transmitting a type code in bit position of an LTR area code, the type code matching an LTR AREA code for a particular site for transmission of normal words and the type code opposite of the LTR AREA code for transmission of special function words.

35. The method of claim 34, further comprising the act of inverting a checksum for communications of special function words from a subscriber to a repeater to avoid misinterpretation of the special function words.

* * * * *

UNITED STATES PATENT AND TRADEMARK OFFICE
CERTIFICATE OF CORRECTION

PATENT NO. : 6,374,115 B1
DATED : April 16, 2002
INVENTOR(S) : Keith W. Barnes, Rory A. Smith and Mervin L. Grindahl It is certified that error appears in the above-identified patent and that said Letters Patent is hereby corrected as shown below:

<u>Title page,</u>
Item [73], Assignee, insert -- Company -- after "Johnson"; and delete "Waseca," and insert -- Burnsville --, therefor.

Signed and Sealed this

Twenty-sixth Day of August, 2003

JAMES E. ROGAN
*Director of the United States Patent and Trademark Office*